United States Patent
O'Brien et al.

(10) Patent No.: US 11,250,027 B2
(45) Date of Patent: *Feb. 15, 2022

(54) DATABASE SYSTEMS AND USER INTERFACES FOR INTERACTIVE DATA ASSOCIATION, ANALYSIS, AND PRESENTATION

(71) Applicant: Palantir Technologies Inc., Palo Alto, CA (US)

(72) Inventors: John O'Brien, New York, NY (US); Advaya Krishna, New York, NY (US); Amr Al Mallah, New York, NY (US); Andrew Poh, San Francisco, CA (US); Christopher Yu, Culver City, CA (US); Daniel Puller, New York, NY (US); Dylan Cooke, New York, NY (US); Jason Chlipala, Los Angeles, CA (US); Mark Cinali, New York, NY (US); Randall Dorin, New York, NY (US); Robert Barton, Hoboken, NJ (US); Samuel Sinensky, New York, NY (US); William Seaton, New York, NY (US); Mitchell Moranis, New York, NY (US)

(73) Assignee: PALANTIR TECHNOLOGIES INC., Denver, CO (US)

(*) Notice: Subject to any disclaimer, the term of this patent is extended or adjusted under 35 U.S.C. 154(b) by 357 days.

This patent is subject to a terminal disclaimer.

(21) Appl. No.: 16/444,493

(22) Filed: Jun. 18, 2019

(65) Prior Publication Data
US 2019/0303390 A1 Oct. 3, 2019

Related U.S. Application Data

(63) Continuation of application No. 15/389,197, filed on Dec. 22, 2016, now Pat. No. 10,360,238.

(51) Int. Cl.
*G06F 16/28* (2019.01)
*G06F 16/25* (2019.01)
*G06F 16/27* (2019.01)

(52) U.S. Cl.
CPC .......... *G06F 16/282* (2019.01); *G06F 16/25* (2019.01); *G06F 16/27* (2019.01)

(58) Field of Classification Search
CPC .................................................. G06F 16/282
See application file for complete search history.

(56) References Cited

U.S. PATENT DOCUMENTS

| 5,515,488 A | 5/1996 | Hoppe et al. | |
| 5,937,364 A * | 8/1999 | Westgard | G06Q 10/06 702/83 |

(Continued)

FOREIGN PATENT DOCUMENTS

| CN | 102546446 | 7/2012 |
| CN | 103167093 | 6/2013 |

(Continued)

OTHER PUBLICATIONS

U.S. Pat. No. 10,360,238, Database Systems and User Interfaces for Interactive Data Association, Analysis, and Presentation, Jul. 23, 2019.

(Continued)

*Primary Examiner* — Eliyah S. Harper
(74) *Attorney, Agent, or Firm* — Knobbe, Martens, Olson & Bear, LLP

(57) ABSTRACT

Embodiments of the present disclosure relate to systems, techniques, methods, and computer-readable mediums for one or more database systems for data processing, including database and file management, as well as systems for accessing one or more databases or other data structures and searching, filtering, associating, and analyzing data. The (Continued)

present disclosure further relates to computer systems and techniques for interactive data visualization and presentation from one or more databases.

20 Claims, 27 Drawing Sheets

(56) References Cited

U.S. PATENT DOCUMENTS

| | | | |
|---|---|---|---|
| 6,381,509 B1 * | 4/2002 | Thiel | G06Q 10/06 |
| | | | 700/115 |
| 6,430,305 B1 | 8/2002 | Decker | |
| 6,820,135 B1 | 11/2004 | Dingman | |
| 6,978,419 B1 | 12/2005 | Kantrowitz | |
| 6,980,984 B1 | 12/2005 | Huffman et al. | |
| 7,168,039 B2 | 1/2007 | Bertram | |
| 7,461,077 B1 | 12/2008 | Greenwood | |
| 7,617,232 B2 | 11/2009 | Gabbert et al. | |
| 7,756,843 B1 | 7/2010 | Palmer | |
| 7,814,470 B2 * | 10/2010 | Mamou | G06F 16/254 |
| | | | 717/162 |
| 7,899,796 B1 | 3/2011 | Borthwick et al. | |
| 7,917,376 B2 | 3/2011 | Bellin et al. | |
| 7,941,321 B2 | 5/2011 | Greenstein et al. | |
| 8,036,971 B2 | 10/2011 | Aymeloglu et al. | |
| 8,037,046 B2 | 10/2011 | Udezue et al. | |
| 8,046,283 B2 | 10/2011 | Burns | |
| 8,054,756 B2 | 11/2011 | Chand et al. | |
| 8,214,490 B1 | 7/2012 | Vos et al. | |
| 8,229,902 B2 | 7/2012 | Vishniac et al. | |
| 8,290,838 B1 | 10/2012 | Thakur et al. | |
| 8,302,855 B2 | 11/2012 | Ma et al. | |
| 8,386,377 B1 | 2/2013 | Xiong et al. | |
| 8,473,454 B2 | 6/2013 | Evanitsky et al. | |
| 8,484,115 B2 | 7/2013 | Aymeloglu et al. | |
| 8,489,641 B1 | 7/2013 | Seefeld et al. | |
| 8,577,911 B1 | 11/2013 | Stepinski et al. | |
| 8,589,273 B2 | 11/2013 | Creeden et al. | |
| 8,688,573 B1 | 4/2014 | Ruknoic et al. | |
| 8,742,329 B2 * | 6/2014 | Korkin | E21B 47/11 |
| | | | 250/266 |
| 8,744,890 B1 | 6/2014 | Bernier | |
| 8,799,799 B1 | 8/2014 | Cervelli et al. | |
| 8,806,355 B2 | 8/2014 | Twiss et al. | |
| 8,812,960 B1 | 8/2014 | Sun et al. | |
| 8,924,388 B2 | 12/2014 | Elliot et al. | |
| 8,924,389 B2 | 12/2014 | Elliot et al. | |
| 8,938,686 B1 | 1/2015 | Erenrich et al. | |
| 8,949,164 B1 | 2/2015 | Mohler | |
| 9,069,842 B2 | 6/2015 | Melby | |
| 9,100,428 B1 | 8/2015 | Visbal | |
| 9,111,281 B2 | 8/2015 | Stibel et al. | |
| 9,129,219 B1 | 9/2015 | Robertson et al. | |
| 9,256,664 B2 | 2/2016 | Chakerian et al. | |
| 9,280,618 B1 | 3/2016 | Bruce et al. | |
| 9,335,911 B1 | 5/2016 | Elliot et al. | |
| 10,360,238 B1 * | 7/2019 | O'Brien | G06F 16/25 |
| 2002/0065708 A1 | 5/2002 | Senay et al. | |
| 2002/0095360 A1 | 7/2002 | Joao | |
| 2002/0095658 A1 | 7/2002 | Shulman | |
| 2002/0103705 A1 | 8/2002 | Brady | |
| 2002/0147805 A1 | 10/2002 | Leshem et al. | |
| 2003/0126102 A1 | 7/2003 | Borthwick | |
| 2003/0187874 A1 * | 10/2003 | Peschel | G06Q 10/10 |
| 2004/0002892 A1 * | 1/2004 | Gluck | G06Q 10/10 |
| | | | 705/310 |
| 2004/0034570 A1 | 2/2004 | Davis | |
| 2004/0101812 A1 * | 5/2004 | Saegusa | A63B 60/42 |
| | | | 434/252 |
| 2004/0111480 A1 | 6/2004 | Yue | |
| 2004/0153418 A1 | 8/2004 | Hanweck | |
| 2004/0236688 A1 | 11/2004 | Bozeman | |
| 2005/0010472 A1 | 1/2005 | Quatse et al. | |
| 2005/0086207 A1 | 4/2005 | Heuer et al. | |
| 2005/0154628 A1 | 7/2005 | Eckart et al. | |
| 2005/0154769 A1 | 7/2005 | Eckart et al. | |
| 2005/0199831 A1 * | 9/2005 | Aimonen | G01N 21/8903 |
| | | | 250/559.01 |
| 2005/0289103 A1 * | 12/2005 | Bier | G06F 16/3322 |
| 2006/0026120 A1 | 2/2006 | Carolan et al. | |
| 2006/0026170 A1 | 2/2006 | Kreitler et al. | |
| 2006/0080283 A1 | 4/2006 | Shipman | |
| 2006/0143034 A1 | 6/2006 | Rothermel | |
| 2006/0143075 A1 | 6/2006 | Carr et al. | |
| 2006/0143079 A1 | 6/2006 | Basak et al. | |
| 2006/0155685 A1 * | 7/2006 | Grim | G06F 16/951 |
| 2007/0000999 A1 | 1/2007 | Kubo et al. | |
| 2007/0011304 A1 | 1/2007 | Error | |
| 2007/0038646 A1 | 2/2007 | Thota | |
| 2007/0150801 A1 | 6/2007 | Chidlovskii et al. | |
| 2007/0156673 A1 | 7/2007 | Maga | |
| 2007/0162454 A1 | 7/2007 | D'Albora et al. | |
| 2007/0185867 A1 | 8/2007 | Maga | |
| 2007/0192122 A1 | 8/2007 | Routson et al. | |
| 2007/0284433 A1 | 12/2007 | Domenica et al. | |
| 2008/0065655 A1 | 3/2008 | Chakravarthy et al. | |
| 2008/0069081 A1 | 3/2008 | Chand et al. | |
| 2008/0077642 A1 | 3/2008 | Carbone et al. | |
| 2008/0103996 A1 | 5/2008 | Forman et al. | |
| 2008/0208735 A1 | 8/2008 | Balet et al. | |
| 2008/0222295 A1 | 9/2008 | Robinson et al. | |
| 2008/0243711 A1 | 10/2008 | Aymeloglu et al. | |
| 2008/0255973 A1 | 10/2008 | El Wade et al. | |
| 2008/0270328 A1 | 10/2008 | Lafferty et al. | |
| 2008/0294663 A1 | 11/2008 | Heinley et al. | |
| 2008/0313132 A1 | 12/2008 | Hao et al. | |
| 2009/0076845 A1 | 3/2009 | Bellin et al. | |
| 2009/0094166 A1 | 4/2009 | Aymeloglu et al. | |
| 2009/0094270 A1 | 4/2009 | Alirez et al. | |
| 2009/0106178 A1 | 4/2009 | Chu | |
| 2009/0112745 A1 | 4/2009 | Stefanescu | |
| 2009/0125359 A1 | 5/2009 | Knapic | |
| 2009/0125459 A1 | 5/2009 | Norton et al. | |
| 2009/0132953 A1 | 5/2009 | Reed et al. | |
| 2009/0157732 A1 | 6/2009 | Hao et al. | |
| 2009/0175530 A1 * | 7/2009 | Sjostrom | G06T 7/0004 |
| | | | 382/152 |
| 2009/0187546 A1 | 7/2009 | Whyte et al. | |
| 2009/0187548 A1 | 7/2009 | Ji et al. | |
| 2009/0249244 A1 | 10/2009 | Robinson et al. | |
| 2009/0254842 A1 | 10/2009 | Leacock et al. | |
| 2009/0259636 A1 | 10/2009 | Labrou et al. | |
| 2009/0271343 A1 | 10/2009 | Vaiciulis et al. | |
| 2009/0307049 A1 | 12/2009 | Elliott et al. | |
| 2009/0313463 A1 | 12/2009 | Pang et al. | |
| 2009/0319418 A1 | 12/2009 | Herz | |
| 2009/0319515 A1 | 12/2009 | Minton et al. | |
| 2009/0319891 A1 | 12/2009 | MacKinlay | |
| 2010/0030722 A1 | 2/2010 | Goodson et al. | |
| 2010/0031141 A1 | 2/2010 | Summers et al. | |
| 2010/0042922 A1 | 2/2010 | Bradateanu et al. | |
| 2010/0057622 A1 | 3/2010 | Faith et al. | |
| 2010/0070842 A1 | 3/2010 | Aymeloglu et al. | |
| 2010/0098318 A1 | 4/2010 | Anderson | |
| 2010/0106752 A1 | 4/2010 | Eckardt et al. | |
| 2010/0114887 A1 | 5/2010 | Conway et al. | |
| 2010/0131502 A1 | 5/2010 | Fordham | |
| 2010/0161735 A1 | 6/2010 | Sharma | |
| 2010/0191563 A1 | 7/2010 | Schlaifer et al. | |
| 2010/0211535 A1 | 8/2010 | Rosenberger | |
| 2010/0235915 A1 | 9/2010 | Memon et al. | |
| 2010/0262688 A1 | 10/2010 | Hussain et al. | |
| 2010/0293174 A1 | 11/2010 | Bennett et al. | |
| 2010/0312837 A1 | 12/2010 | Bodapati et al. | |
| 2010/0332534 A1 * | 12/2010 | Chang | G06F 16/13 |
| | | | 707/770 |
| 2011/0040776 A1 | 2/2011 | Najm et al. | |
| 2011/0061013 A1 | 3/2011 | Bilicki et al. | |
| 2011/0078173 A1 | 3/2011 | Seligmann et al. | |
| 2011/0093327 A1 | 4/2011 | Fordyce, III et al. | |
| 2011/0099133 A1 | 4/2011 | Chang et al. | |
| 2011/0153384 A1 | 6/2011 | Horne et al. | |
| 2011/0173093 A1 | 7/2011 | Psota et al. | |

(56) References Cited

U.S. PATENT DOCUMENTS

| | | |
|---|---|---|
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0030228 A1* | 2/2012 | Naidu .................. G06F 16/951 707/767 |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0271882 A1* | 10/2012 | Sachdeva ......... H04N 21/41407 709/204 |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026713 A1* | 1/2016 | Katie ................ G06F 16/24578 707/709 |
| 2016/0180557 A1 | 6/2016 | Yousaf et al. |
| 2016/0350674 A1* | 12/2016 | Midboe ................ H04L 67/327 |
| 2016/0353985 A1* | 12/2016 | Haddadi .............. A61B 5/0022 |
| 2017/0146975 A1* | 5/2017 | Clark ................ G05B 19/41875 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |
| WO | WO 2012/061162 | 5/2012 |

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

DISTIMO—App Analytics, <http://www.distimo.com/app-analytics> Printed Jul. 18, 2013 in 5 pages.

Flurry Analytics, <http://www.flurry.com/> Printed Jul. 18, 2013 in 14 pages.

(56) References Cited

OTHER PUBLICATIONS

Gill et al., "Computerised Linking of Medical Records: Methodological Guidelines,".
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics —Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
"Refresh CSS Ellipsis When Resizing Container-Stack Overflow," Jul. 31, 2013, retrieved from internet http://stackoverflow.com/questions/17964681/refresh-css-ellipsis-when-resizing-container, retrieved on May 18, 2015.
"SAP BusinessObjects Explorer Online Help," Mar. 19, 2012, retrieved on Apr. 21, 2016 http://help.sap.com/businessobject/product_guides/boexir4/en/xi4_exp_user_en.pdf.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing On The Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.

Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/483,527 dated Apr. 29, 2016.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/858,647 dated Mar. 4, 2016.
Official Communication for European Patent Application No. 14187996.5 dated Feb. 12, 2015.
Official Communication for European Patent Application No. 14187996.5 dated Feb. 19, 2016.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 15200073.3 dated Mar. 30, 2016.
Official Communication for European Patent Application No. 15201924.6 dated Apr. 25, 2016.
Official Communication for European Patent Application No. 15202919.5 dated May 9, 2016.
Official Communication for European Patent Application No. 16152984.7 dated Mar. 24, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.

(56) References Cited

OTHER PUBLICATIONS

Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/141,252 dated Apr. 14, 2016.
Official Communication for U.S. Appl. No. 14/141,252 dated Oct. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated Jun. 16, 2016.
Official Communication for U.S. Appl. No. 14/225,160 dated May 20, 2015.
Official Communication for U.S. Appl. No. 14/225,160 dated Apr. 22, 2016.
Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated May 25, 2016.
Official Communication for U.S. Appl. No. 14/929,584 dated Feb. 4, 2016.
Notice of Allowance for U.S. Appl. No. 15/389,197 dated Mar. 13, 2019.
Official Communication for U.S. Appl. No. 15/389,197 dated Jul. 12, 2017.
Official Communication for U.S. Appl. No. 15/389,197 dated May 22, 2018.
Official Communication for U.S. Appl. No. 15/389,197 dated Jan. 23, 2018.

* cited by examiner

QUALITY INVESTIGATION PORTAL

Match [ ALL ] [ ANY ] of the selected filters below: — 104

Problem Categories: ☐

Repair location(s): ☑ [ Operation #1  ✕ ]  Option Codes: ☐ — 108

Failure Type(s): ☑ [ Failure Code #1  ✕ ] — 112  Failure Part(s): ☐ — 114

In-Plant Fix Problem(s): ☐ — 116

132 —
Dates: ☐ [ 📅 1 October, 2014  ✕ ]  to  [ 📅 30 September, 2015  ✕ ]

136 —
Model Number: ☑ [ 2014 ] [ 2015 ]

[ 🔍 Update Search ]

[ ⊕ Clear All ]

FIG. 1

QUALITY INVESTIGATION PORTAL

Claim Description Summary Table for Search Results

| ☐ | Claim ◆ | UID ◆ | Operation ◆ | Failure Type ◆ | Failure Parts ◆ | Repair Description ◆ |
|---|---|---|---|---|---|---|
| ☐ | Claim #1 | UID #1 | Operation #1 | Failure Type #1 (504) | ABC1234 | Repair Description #1 |
| ☐ | Claim #2 | UID #2 | Operation #2 (508) | Failure Type #2 | DEF5678 | Repair Description #2 |

FIG. 5

QUALITY INVESTIGATION PORTAL — 600

SEARCH SUMMARY | CLAIM DESCRIPTION DETAIL | IN-PLANT FIX DETAIL — 604 | OPTION CODES | CUSTOMER SURVEY RESPONSES

In-Plant Fix Problems for Search Results

Keyword filter: [        ]   ANY | ALL

Include the following problem type(s): — 608
☑ Customer Surveys ☑ Free Text

[Add Selected Operations as Keywords] [Add Selected Failure Types as Keywords] [Clear] — 616

| Problem ID ◆ — 612 | In-Plant Fix Description | Resulting UID Count ▼ |
|---|---|---|
| ☐ Problem ID #1 | Description #1 | 76 |
| ☐ Problem ID #2 | Description #2 | 76 |
| ☐ Problem ID #3 | Description #3 | 76 |
| ☐ Problem ID #4 | Description #4 | 76 |
| ☐ Problem ID #5 | Description #5 | 76 |
| ☐ Problem ID #6 | Description #6 | 76 |
| ☐ Problem ID #7 | Description #7 | 76 |
| ☐ Problem ID #8 | Description #8 | 76 |
| ☐ Problem ID #9 | Description #9 | 76 |
| ☐ Problem ID #10 | Description #10 | 76 |
| ☐ Problem ID #11 | Description #11 | 76 |
| ☐ Problem ID #12 | Description #12 | 76 |
| ☐ Problem ID #13 | Description #13 | 76 |
| ☐ Problem ID #14 | Description #14 | 76 |

Showing 1 to 20 of 2,229 entries — 628 | [Select ALL] [Select None] [⊕Add Selected In-Plant Fix Problems to Interested Set Below] [⊕Add Selected In-Plant Fix Problems to Global Search Restriction] — 620

Previous 1 2 3 4 5 ...112 Next — 624

FIG. 6

QUALITY INVESTIGATION PORTAL

In-Plant Fix Problems for Search Results — Keyword filter: WIDGET A — ANY | ALL — 704

Include the following problem type(s): ☑ Customer Surveys ☐ Free Text

[Add Selected Operations as Keywords] [Add Selected Failure Types as Keywords] [Clear]
— 732

| Problem ID ▲▼ | In-Plant Fix Description | Resulting UID Count ▼ |
|---|---|---|
| ☐ Problem ID #1 | Description #1 | 76 |
| ☐ Problem ID #2 | Description #2 | 76 |
| ☐ Problem ID #3 | Description #3 | 76 |
| ☐ Problem ID #4 | Description #4 | 76 |
| ☐ Problem ID #5 | Description #5 | 76 |
| ☐ Problem ID #6 | Description #6 | 76 |
| ☐ Problem ID #7 | Description #7 | 76 |
| ☐ Problem ID #8 | Description #8 | 76 |
| ☐ Problem ID #9 | Description #9 | 76 |
| ☐ Problem ID #10 | Description #10 | 76 |
| ☐ Problem ID #11 | Description #11 | 76 |
| ☐ Problem ID #12 | Description #12 | 74 |
| ☐ Problem ID #13 | Description #13 | 74 |
| ☐ Problem ID #14 | Description #14 | 16 |

Showing 1 to 20 of 125 entries — 620 — 624 — Previous [1] 2 3 4 5 .... 6 7 Next

[Select All] [Select None] [⊕ Add Selected In-Plant Fix Problems to Interested Set Blow] [⊕ Add Selected In-Plant Fix Problems to Global Search Restriction]

Relevant In-Plant Fix Problems:

[Description #1] [Description #2] [Description #3] [Clear Problems]
[Description #4]

QUALITY INVESTIGATION PORTAL

Resulting In-plant Fix Problems, Full Detail

☑ Customer Surveys ☑ Free Text  Select problem type(s) for inclusion:

Number of UIDs included: 16

🔍 Load In-plant Fix Problems

| 808 UID | 812 Repair Location | 816 Failure Type | Claim 820 Repair Description | 824 Prob ID | 828 Prob Desc | 832 Prob Time | 836 Prob Dept | 840 Prob Zone | 844 Signoff Time | 848 Signoff Dept | 852 Signoff Zone | 860 Marked? |
|---|---|---|---|---|---|---|---|---|---|---|---|---|
| ☐ UID #1 | Location #1 | Failure Type #1 | Description #1 | Prob. ID #1 | Prob. Desc #1 | 2015-10-25 08:20 | Dept #1 | Zone #1 | 2015-10-25 08:28 | Dept #4 | Zone #4 | false |
| ☐ UID #2 | Location #1 | Failure Type #2 | Description #2 | Prob. ID #2 | Prob. Desc #2 | 2015-12-22 09:46 | Dept #2 | Zone #2 | 2015-12-22 09:47 | Dept #4 | Zone #4 | false |
| ☐ UID #3 | Location #1 | Failure Type #3 | Description #3 | Prob. ID #3 | Prob. Desc #3 | 2015-08-30 17:13 | Dept #2 | Zone #2 | 2015-08-30 17:15 | Dept #4 | Zone #5 | true |
| ☐ UID #4 | Location #1 | Failure Type #4 | Description #4 | Prob. ID #4 | Prob. Desc #4 | 2015-10-27 19:33 | Dept #2 | Zone #3 | 2015-10-27 20:26 | Dept #5 | Zone #5 | false |
| ☑ UID #5 | Location #1 | Failure Type #5 | Description #5 | Prob. ID #5 | Prob. Desc #5 | 2015-10-27 19:33 | Dept #3 | Zone #3 | 2015-10-27 20:26 | Dept #6 | Zone #6 | true |

Showing 1 to 20 of 190 entries

[Select All] [Select None]

Previous [1] 2 3 4 5 ... 10 Next

FIG. 8

QUALITY INVESTIGATION PORTAL

Warranty/In-Plant Fix Pivot Table

- ● Repair Location First ☑ Show Pivot
- ○ Failure Type First ☑ Show Repair Location/Failure Type intersection 908

| Repair Locations All — 904 | Failure Type(s) | Marked 912 | Unmarked 916 | Total 920 | Marked % 924 | Unmarked % 928 |
|---|---|---|---|---|---|---|
| Repair Location | All Failure Types | 21 | 211 | 232 | 9% | 91% 932 |
| Repair Location #1 | All Failure Types | 3 | 27 | 30 | 10% | 90% 936 |
|  | Failure Type #1 | 0 | 13 | 13 | 0% | 100% 940 |
|  | Failure Type #2 | 0 | 3 | 3 | 0% | 100% |
|  | Failure Type #3 | 2 | 1 | 3 | 67% | 33% 944 |
|  | Failure Type #4 | 1 | 2 | 3 | 33% | 67% |
|  | Failure Type #5 | 0 | 2 | 2 | 0% | 100% |
|  | Failure Type #6 | 0 | 2 | 2 | 0% | 100% |
|  | Failure Type #7 | 0 | 1 | 1 | 0% | 100% |
|  | Failure Type #8 | 0 | 1 | 1 | 0% | 100% |
|  | Failure Type #9 | 0 | 1 | 1 | 0% | 100% |
| Repair Location #2 | All Failure Types | 3 | 19 | 22 | 14% | 86% |
|  | Failure Type #11 | 3 | 7 | 10 | 30% | 70% |

FIG. 9

QUALITY INVESTIGATION PORTAL
1100

| Option Code 1104 | UIDs in Selection 1108 | % of Selected 1112 | % of Built 1116 | % Selected-Built 1120 | Min Log Odds Ratio 1124 |
|---|---|---|---|---|---|
| ☐ Option Code #1 | 12 | 5% | 0% | 5% | 14.4 |
| ☐ Option Code #2 | 12 | 5% | 0% | 5% | 13.3 |
| ☐ Option Code #3 | 1 | 0% | 0% | 0% | 12.2 |
| ☐ Option Code #4 | 24 | 11% | 1% | 10% | 9.9 |
| ☐ Option Code #5 | 24 | 11% | 1% | 10% | 8.7 |
| ☐ Option Code #6 | 2 | 1% | 0% | 1% | 5.3 |
| ☐ Option Code #7 | 4 | 2% | 0% | 2% | 3.6 |
| ☐ Option Code #8 | 2 | 1% | 0% | 1% | 3.2 |
| ☐ Option Code #9 | 2 | 1% | 0% | 1% | 3.2 |
| ☐ Option Code #10 | 1 | 0% | 0% | 0% | 3.0 |

SELECT A DEFECT — 1304

| Defect | SOURCE STATION | SOURCE STATION 2 | BUCKET | Last Modified By |
|---|---|---|---|---|
| ☑ DEFECT #1 | XXXXX | XXXXX | XXXXXX | USER #1 |
| DEFECT #2 | XXXXX | XXXXX | XXXXXX | USER #2 |
| DEFECT #3 | XXXXX | XXXXX | | USER #3 |
| DEFECT #4 | XXXXX | | | USER #4 |
| DEFECT #5 | XXXXX | | XXXXXX | USER #5 |
| DEFECT #6 | XXXXX | | XXXXXX | USER #6 |
| DEFECT #7 | XXXXX | | XXXXXX | USER #7 |

KEYWORD FILTER — 1308   SOURCE STATION — 1312   DEFECT

1316

ABOUT THIS DEFECT — 1320                        XXXXXXXXXX XX XXX XXXXXX

DEFECT DESCRIPTION : DESCRIPTION #1
SOURCE STATION(S) :  #153      #168
UA:                  Interior  Interior

[ 🗑 Delete This Defect ]           ○ Add New Defect   [ ✓ Update This Defect ]

THIS DEFECT'S PROBLEMS — 1340

ADD NEW PROBLEM   LOOP   STATION
[ 🗑 Delete Selected Problem(s) ]   [         ]   [ 1 ▾ ] [         ]   [ ✓ Add New Problem ]

CHECKLIST DESCRIPTION XXXXX

| LOOP | Problem ID | Problem Description | Station ID | User | Date Added |
|---|---|---|---|---|---|
| 2 | PID #1 | Description #1 | XXXX | XXXX | XXXX |
| 2 | PID #2 | Description #2 | XXXX | XXXX | XXXX |
| 2 | PID #3 | Description #3 | XXXX | XXXX | XXXX |
| 2 | PID #4 | Description #4 | XXXX | XXXX | XXXX |

THIS DEFECT'S RULES — 1360

☐ Rule #  Defection
☐ 1  Repair Location(s)  Repair Location #1  Failure Type(s)  xxxxxxxxxxxxx
☐ 2  Repair Location(s)  Repair Location #1  Failure Type(s)  xxxxxxxxxxxxx
☐ 3  Repair Location(s)  Repair Location #1  Failure Type(s)  xxxxxxxxxxxxx   [ Keyword | XX ]
☐ 4  Failure Part Number(s)  123AB
☐ 5  Failure Part Number(s)  468DE
☐ 6  Failure Part Number(s)  577XR
☐ 7  Failure Part Number(s)  168PU
☐ 8  Failure Part Number(s)  839LW

[ 🗑 Delete Selected Rule(s) ]

STALE DEFECT — 1372 — 1374

| KEYWORD FILTER | SOURCE STATION | | | DEFECT |
|---|---|---|---|---|
| [ALL ▼] | | | | [ALL ▼] |
| 1376 Defect | SOURCE STATION | SOURCE STATION 2 | BUCKET | Last Modified By |
| ☑ DEFECT #1 | XXXXX | XXXXX | XXXXXX | USER #1 |
| DEFECT #2 | XXXXX | XXXXX | XXXXXX | USER #2 |
| DEFECT #3 | XXXXX | XXXXX | | USER #3 |
| DEFECT #4 | XXXXX | | | USER #4 |
| DEFECT #5 | XXXXX | | XXXXXX | USER #5 |
| DEFECT #6 | XXXXX | | XXXXXX | USER #6 |
| DEFECT #7 — 1380 | XXXXX | | XXXXXX | USER #7 |

NEW DEFECT — 1382 — 1384  XXXXXXXXXX XX XXX XXXXXX

| KEYWORD FILTER | SOURCE STATION | | | DEFECT |
|---|---|---|---|---|
| [ALL ▼] | | [▼] | | [ALL ▼] |
| Defect | SOURCE STATION | SOURCE STATION 2 | BUCKET | Last Modified By |
| DEFECT #11 | XXXXX | XXXXX | XXXXXX | USER #1 |
| DEFECT #12 | XXXXX | XXXXX | XXXXXX | USER #2 |
| DEFECT #13 | XXXXX | XXXXX | | USER #3 |
| DEFECT #14 | XXXXX | | | USER #4 |
| DEFECT #15 | XXXXX | | XXXXXX | USER #5 |
| DEFECT #16 | XXXXX | | XXXXXX | USER #6 |

XXXXXXXXXX XX XXX XXXXXX

ABOUT THIS DEFECT — 1386

DEFECT DESCRIPTION : DESCRIPTION #1
SOURCE STATION(S) : [#153 ▼]  [#168 ▼]
UA: [Interior ▼]  [Interior ▼]

[🗑 Delete This Defect]     ⊙ Add New Defect  [✓ Update This Defect]

2404 — UID | 2408 — BUILD DATE | DEFECT | Source Station and crew | 2412 — Loop 1 Checks | 2416 — Loop 2 Checks | 2420 — Loop 3 Checks | 2424 — Loop 4 Checks | Repair Description 📅 1 September, 2015 ☒  TO  📅 29 February, 2016 ☒

UIDs

| UID | BUILD DATE ⇅ | DEFECT | Source Station and crew | Loop 1 Checks | Loop 2 Checks | Loop 3 Checks | Loop 4 Checks | Repair Description |
|---|---|---|---|---|---|---|---|---|
| UID #1 | 2015-09-16 | DEFECT #1 | Crew C | | xxxxxx xxxx | | xx xxxxxx | |
| UID #2 | 2015-09-15 | DEFECT #1 | Crew A | | xxxxxx xxxx | ▶ xxxxxx xxxxx | xx xxxxxx | |
| UID #3 | 2015-09-01 | DEFECT #1 | Crew A | | xxxxxx xxxx | ▶ xxxxxx xxxxx | xx xxxxxx | |
| UID #4 | 2015-09-02 | DEFECT #1 | Crew C | | xxxxxx xxxx | ▶ xxxxxx xxxxx | xx xxxxxx | |
| UID #5 | 2015-09-02 | DEFECT #1 | Crew B | | xxxxxx xxxx | ▶ xxxxxx xxxxx | xx xxxxxx | |
| UID #6 | 2015-09-04 | DEFECT #1 | Crew A | | xxxxxx xxxx | ▶ xxxxxx xxxxx | xx xxxxxx | |
| UID #7 | 2015-09-05 | DEFECT #1 | Crew A | | xxxxxx xxxx | ▶ xxxxxx xxxxx | xx xxxxxx | |

Showing 1 to 20 of 1000 entries

Previous  1  2  3  4  5 .... 57  Next

FIG. 22

DATABASE SYSTEMS AND USER INTERFACES FOR INTERACTIVE DATA ASSOCIATION, ANALYSIS, AND PRESENTATION

RELATED APPLICATIONS

The present application is a continuation application of U.S. patent application Ser. No. 15/389,197, filed Dec. 22, 2016, the entire contents of which is hereby expressly incorporated by reference herein in its entirety and for all purposes. In addition, any and all applications for which a foreign or domestic priority claim is identified in the application data sheet as filed with the present application are also expressly incorporated by reference.

TECHNICAL FIELD

The present disclosure relates to database systems and techniques for data processing, including database and file management, as well as systems for accessing one or more databases or other data structures and searching, filtering, associating, and analyzing data. The present disclosure further relates to computer systems and techniques for interactive data visualization and presentation from one or more databases.

BACKGROUND

Electronic databases provide for storage and retrieval of digital data records. Data records in such databases may be electronically accessed, searched, and updated.

SUMMARY

The systems, methods, and devices described herein each have several aspects, no single one of which is solely responsible for its desirable attributes. Without limiting the scope of this disclosure, several non-limiting features will now be described briefly.

Existing quality control systems may not facilitate linking in-field warranty data with in-plant manufacturing data. They also may not have flexible and interactive search, analysis, and visualization tools. Using existing systems to identify problem areas in the manufacturing chain requires a manual, tedious, and time-consuming process. This results in a slow and ineffective manufacturing improvement process, leading to higher manufacturing and warranty repair costs.

A flexible and interactive search, analysis, and visualization database system operable on both in-field (external) and in-plant (internal) quality data is disclosed. The system can permit a user to establish a link between an external quality data item and an internal quality data item. The system can enable search and filtering using any type of in-field or in-plant quality data or process data, or using an established link. The system can perform analysis based on configurable criteria. The system can present interactive visualization of data to help a user detect problematic areas of quality control. The system can permit user interactions to direct search or visual presentation to a form or content of interest to the user.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

An embodiment according to the present disclosure can provide combinations of external quality data items and internal quality data items according to user-directed search criteria. The combinations can be systematically presented to the user, providing the user a comprehensive set of data and possible combinations of associations between external quality data items and internal quality data items. These advantages comprise improvements to the functioning of the computer (e.g., as data is stored and processed more efficiently for use in the present application), and improvements in user-machine interactions. The user can provide indication of true associations among the possible combinations of associations based on a comprehensive yet focused view of data. In contrast with an ad hoc approach, such user-system interactions greatly enhance a user's ability to detect quality problems.

Also, in various embodiments, data links are dynamically established interactively in response to user inputs. An embodiment can generalize a data link established between an external quality data item and an internal quality data item, linking other external quality data items and internal quality data items of the same or an equivalent value. Advantageously, this automatic association between external quality data items and internal quality data items enables a user to search across a product line based on a data link established for one unit of production, enabling a more efficient search and further improvements to the functioning of the computer.

Additionally, in various embodiments, the system enables definitions of defect matching rules. Defect matching rules can associate one or more types and/or values of external quality data items and one or more types and/or values of internal quality data items with a defect definition. Defect matching rules are automatically and dynamically updated interactively in response to user inputs. Accordingly, the system provides improvements to the functioning of the computer in that search through large amounts of data (e.g., hundreds of thousands, millions, or more data items) can be performed using dynamic rules, improving search efficiency.

By enabling dynamic data links or dynamic defect matching rules, various embodiments according to the present disclosure can help a user associate data items in disparate databases which may appear distinct or unrelated. Various embodiments can also help a user generalize an association between external quality data item and internal quality data item associated with one unit of production and apply the association across the product line. Such embodiments allow a user to work with a relatively small and manageable size of data set, but generally apply the user's input across a large and perhaps unwieldy size of data set. This can enable the user to obtain results the user would not be able to obtain otherwise.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, quality data and may enable a user to more quickly and accurately access, navigate, assess, and digest the quality data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, quality data), translation and delivery of those inputs to various system components, automatic and dynamic execution of complex processes in response to the input delivery, automatic interaction among various components and processes of the system, and automatic and dynamic updating of the user interfaces (to, for example, display the quality data in heat maps, etc.). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing database technology is limited in its ability to associate disparate data fields in separate databases, and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic quality data, and presentation of the updates to displayed quality data via interactive graphical user interfaces. Such features and others (e.g., rendering of a map from ASCII characters using a spreadsheet program) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic quality data.

According to an embodiment, the following is disclosed: a database system for analyzing a process by accessing one or more data stores or databases and processing data items accessed from those one or more data stores or databases, the database system comprising: one or more data stores configured to store: computer readable program instructions, and a set of quality data including internal quality data items and external quality data items, wherein the quality data items are associated with defects; a communication component for communicating over a communication network or medium; and one or more processors configured to execute the computer readable program instructions in order to: receive one or more search criteria; based on the one or more search criteria, identify a set of internal quality data items and a set of external quality data items, wherein internal and external quality data items in the respective sets are associated with a unit identifier; determine combinations of the internal quality data items of the set of internal quality data items and the external quality data items of the set of external quality data items; generate user interface data configured for rendering a first user interface, the first user interface including a listing of each of the determined combinations of internal quality data items and external quality data items; receive an indication of an association between a first internal quality data item and a first external quality data item of one of the determined combinations; establish a link between a type/value pair of the first internal quality data item and a type/value pair of the first external quality data item, wherein the link is indicative of an uncaptured defect; and generate user interface data configured for rendering a second user interface, the second user interface including a table showing a plurality of columns indicating at least the association between a first internal quality data item and a first external quality data item, and the link between the type/value pair of the first internal quality data item and the type/value pair of the first external quality data item.

According to an aspect, the second user interface further includes the table showing: in a first column, first indications of one or more type/value pairs of the internal quality data items of the set of internal quality data items or the external quality data items of the set of external quality data items; in a second column, second indications of numbers of combinations of internal quality data items and external quality data items of the one or more type/value pairs that are linked, thereby indicating numbers of uncaptured defects; in a third column, third indications of numbers of combinations of internal quality data items and external quality data items of the one or more type/value pairs that are not linked, thereby indicating numbers of captured defects or undetected defects; and in a fourth column, fourth indications of total numbers of combinations of internal quality data items and external quality data items of the one or more type/value pairs, thereby indicating total numbers of internal and external defects.

According to an aspect, a search criterion of the one or more search criteria is received via a user interface presenting internal quality data items in the identified set or external quality data items in the identified set.

According to an aspect, the one or more processors is further configured to store the established link in a data store.

According to an aspect, the computer readable program instructions, when executed, further configure the one or more processors to: receive an indication of a disassociation of a second external quality data item and a second internal quality data item linked with the second external quality data item; and de-establish the link between a value of the second external quality data item and a value of the second internal quality data item in response to the indication.

According to an aspect, the computer readable program instructions, when executed, further configure the one or more processors to: classify the uncaptured defect based on a last quality checkpoint in the set of external quality data items and the set of internal quality data items associated with the unit identifier; and generate a visual presentation based, at least in part, on the classification of the defect.

According to an aspect, the second, third, and fourth indications of numbers represent numbers of units.

According to an aspect, the second, third, and fourth indications of numbers are percentage numbers.

According to another embodiment, the following is disclosed: a database system for analyzing a process by accessing one or more data stores or databases and processing data items accessed from those one or more data stores or databases, the database system comprising: one or more data stores configured to store: computer readable program instructions, a set of quality data including internal quality data items and external quality data items, wherein the quality data items are indicative of defects, and a plurality of defect matching rules each indicative of one of a plurality of species of defects, wherein each defect matching rule indicates: a type/value pair of internal quality data item indicative of an internal defect, and a type/value pair of external quality data item indicative of an external defect; and a communication component for communicating over a communication network or medium; and one or more processors configured to execute the computer readable program instructions in order to: apply the defect matching rules to the quality data items to identify numbers of internal defects of various species; apply the defect matching rules to the quality data items to identify numbers of external defects of various species; determine combinations of the internal quality data items of various species and the external quality data items of various species, wherein each combination includes at least an internal quality data item and an external quality data item associated with a same unit identifier; apply the defect matching rules to the combinations to identify one or more uncaptured defects, wherein each uncaptured defect of the set comprises a combination that satisfies at least one of the defect matching rules; and generate user interface data configured for rendering a third user interface, the third user interface including: a prioritized list indicating, for each of the plurality of species of defects, a frequency of external defects associated with the set of quality data; and a bubble chart comprising an x-axis, a y-axis, and a plurality of bubbles each corresponding to one of the plurality of species of defects and spatially located based on corresponding values of the x-axis and y-axis.

According to an aspect, satisfying a defect matching rule comprises the internal quality data item of the combination matching an internal quality data type/value pair of the defect matching rule and the external quality data item of the combination matching an external quality data type/value pair of the defect matching rule.

According to an aspect, the x-axis indicates a rate of uncaptured defects, the y-axis indicates a combined rate of internal and external defects, and a size of each bubble proportionally indicates the frequency of external defects of the respective species of defects associated with the set of quality data.

According to an aspect, the one or more processors further executes the computer readable program instructions in order to: generate user interface data configured for rendering a fourth user interface, the fourth user interface supporting entry of quality type/value pairs to be associated with a defect matching rule.

According to an aspect, the combinations of the internal quality data items of various species and the external quality data items of various species are further associated with a quality control unit.

According to an aspect, the quality control unit is a manufacturing station.

According to yet another embodiment, the following is disclosed: a database system for analyzing a process by accessing one or more data stores or databases and processing data items accessed from those one or more data stores or databases, the database system comprising: one or more data stores configured to store: computer readable program instructions, a set of quality data including internal quality data items and external quality data items, wherein the quality data items are indicative of defects, and a plurality of defect matching rules each indicative of one of a plurality of species of defects, wherein each defect matching rule indicates: a type/value pair of internal quality data item indicative of an internal defect, and a type/value pair of external quality data item indicative of an external defect; and a communication component for communicating over a communication network or medium; and one or more processors configured to execute the computer readable program instructions in order to: apply the defect matching rules to the quality data items to identify numbers of internal defects of various species; apply the defect matching rules to the quality data items to identify numbers of external defects of various species; determine combinations of the internal quality data items of various species and the external quality data items of various species, wherein each combination includes at least an internal quality data item and an external quality data item associated with a same unit identifier; apply the defect matching rules to the combinations to identify one or more uncaptured defects, wherein each uncaptured defect of the set comprises a combination that satisfies at least one of the defect matching rules; and generate user interface data configured for rendering a third user interface, the third user interface including a heat map containing a layout of a production line showing the plurality of quality control units, wherein representation of a first quality control unit in the plurality of quality control units is based on a last quality checkpoint detecting a defect associated with the first quality control unit.

According to an aspect, satisfying a defect matching rule comprises the internal quality data item of the combination matching an internal quality data type/value pair of the defect matching rule and the external quality data item of the combination matching an external quality data type/value pair of the defect matching rule.

According to an aspect, the third user interface further includes a prioritized list indicating, for each of the plurality of quality control units, a frequency of external defects associated with the set of quality data.

According to an aspect, the layout of the production line is generated from a comma-separated-values file.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above- and/or below-described embodiments (including one or more aspects of the appended claims).

In various embodiments, computer-implemented methods are disclosed in which, under control of one or more hardware computing devices configured with specific computer executable instructions, one or more aspects of the above- and/or below-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above- and/or below-described embodiments (including one or more aspects of the appended claims).

BRIEF DESCRIPTION OF THE DRAWINGS

Throughout the drawings, reference numbers, if re-used, indicate correspondence between referenced elements. The drawings are provided to illustrate embodiments of the inventive subject matter described herein and not to limit the scope thereof.

FIG. 1 illustrates a screen for a global search of an example quality control database and interface system.

FIG. 5 illustrates an example summary table for search results.

FIG. 6 illustrates an example table listing In-Plant Fix problems in a global search result.

FIG. 7 illustrates an example table listing In-Plant Fix problems in a global search result with an additional keyword filter.

FIG. 8 illustrates an example table listing combinations of internal quality data items and external quality data items for individual unit IDs.

FIG. 9 illustrates an example Warranty/In-Plant Fix pivot table.

FIG. 11 illustrates an example table showing quality metrics based on option code.

FIG. 12 illustrates an example User Interface (UI) for associating internal quality type/value pairs and external quality type/value pairs to a defect.

FIG. 13 illustrates an example User Interface (UI) for listing stale and new defects.

FIG. 22 illustrates an example table showing data selected through a heat map bar chart.

DETAILED DESCRIPTION

Figure 2:
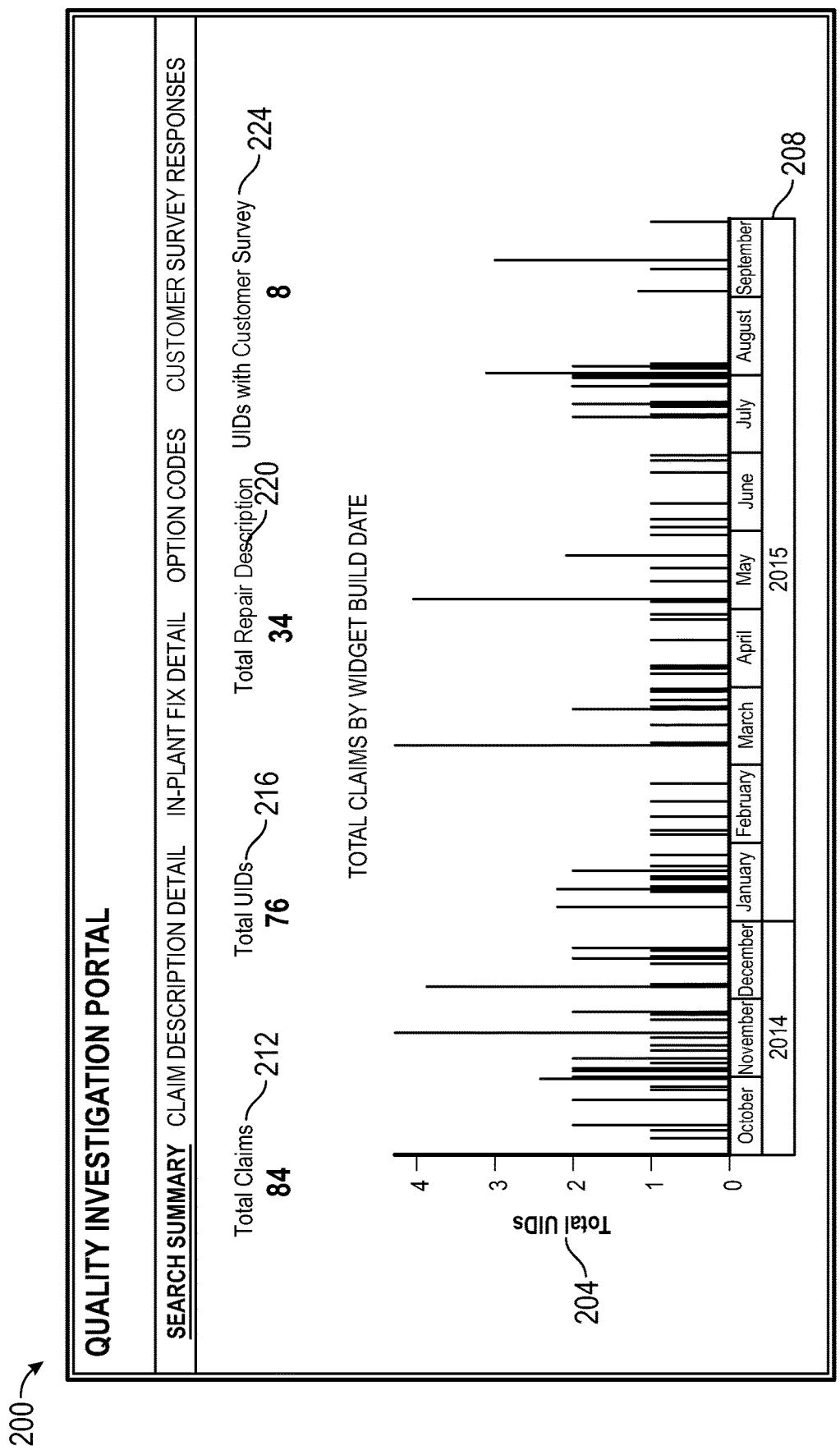
FIG. 2 illustrates a presentation of a global search result of warranty claims by product build date.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

A database system is disclosed which can process a plurality of disparate databases simultaneously. The database system can search the plurality of databases, establish data links between two databases in response to user inputs, and perform additional searches based, at least in part, on the established data links. In various embodiments, the database system can define rules matching different types of data in disparate databases and perform additional searches based, at least in part, on the established rules. The database system can present dynamic and interactive visualization of data to direct search or visual presentation to a form or content of interest to the user.

FIGS. 1 to 25 illustrate example embodiments according to the present disclosure in the context of a widget or product manufacturer. This context is used for the purpose of illustration only. Implementations according to the present disclosure can be applied to other industries which assign a product ID (for example, a serial number or other unique identifier) to product units. By way of an example and not a limitation, most consumer electronic products and other manufactured goods have individual serial numbers. Accordingly, implementations according to the present disclosure can be applied to any other manufacturing industry such as goods manufacturing, vehicle manufacturing, computer manufacturing, etc.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). Examples of data stores of the present disclosure include remote data stores 2830 and local data stores 2824 described below in reference to FIG. 27.

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, extensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Unit of Production: Any individual item or entity that is produced. A unit of production may be a product or an item of goods, for example. Each unit of production is associated with a unit identifier, which may be referred to herein as a product identifier or product ID.

Quality Data: Any data indicative of a quality of manufactured goods/products. Quality data may indicate, for example, defects found or fixed, components with defects or fixed, operations to fix defects, quality control issues found or addressed, warranty claims made or addressed, etc. As described below, in an implementation each quality data item is associated with at least one unit of production, where the unit of production is indicated by its unit identifier. Accordingly, any given unit of production/unit identifier may be associated with multiple quality data items since a given product may be associated with multiple defects or quality control issues, and each defect or quality control issue may be associated with multiple components, operations, etc. Quality data may be stored in, for example, remote data stores 2830 and local data stores 2824 described below in reference to FIG. 27.

Defect: Any problem or issue associated with a product of a manufacturing process. Defects may include, for example, production issues, quality control issues, warranty claims, components problems, operation problems, responses to customer surveys, etc. Defects may be associated with internal quality data and/or external quality data.

Internal Quality Data: Any quality data associated with any quality issues detected or identified by a manufacturer and its agents or other entities associated with a manufacturer. For example, internal quality data may indicate defects found or fixed as part of an in-plant manufacturing or quality control step for a given unit of production, or an in-plant operation to fix a defect, etc. Internal quality data can also include quality data associated with quality issues detected by a manufacturer's agents or other entities associated with a manufacturer. In some examples, if the manufacturer owns a fleet of delivery trucks, internal quality data may also include quality data associated with quality issues detected by truck drivers. Internal quality data contrasts with external quality data.

External Quality Data: Any quality data associated with out-of-plant or in-field processes. For example, external quality data may indicate defects found or addressed as part of a warranty process or claim after a unit of production is in the field (e.g., out of the manufacturing plant), a response to a customer survey or a warranty claim questionnaire, etc. External quality data contrasts with internal quality data.

Process Data: Any data related to a manufacturing process (e.g., an in-plant process to manufacture units of production). For example, process data may include information such as production line mapping, manufacturing station/task pairing, manufacturing team composition, etc. Process data may be stored in, for example, remote data stores 2830 and local data stores 2824 described below in reference to FIG. 27.

Undetected Defects: Any defect that appears in external quality data for a given unit of production, but does not appear in corresponding internal quality data for the unit of production. Thus, an undetected defect is one that is not detected in plant (e.g., there is no corresponding internal quality data item), but later appears in field (e.g., as a warranty claim as indicated by an external quality data item). While the term "undetected defect" is used for convenience herein, it is to be understood that quality data items other than defects may be undetected, and the systems and methods described herein may be applied equally to any type of quality data item.

Uncaptured Defects: Any defect that appears in both internal quality data and corresponding external quality data for a given unit of production. Thus, an uncaptured defect is one that is detected in plant (e.g., there is a corresponding internal quality data item), but also appears in field (e.g., as a warranty claim as indicated by an external quality data item) or outside the control of a manufacturer. While the term "uncaptured defect" is used for convenience herein, it is to be understood that quality data items other than defects may be uncaptured, and the systems and methods described herein may be applied equally to any type of quality data item.

Captured Defects: Any defect that appears only in internal quality data and not in corresponding external quality data for a given unit of production. Thus, a captured defect is one that is detected in plant (e.g., there is a corresponding internal quality data item) and remedied such that it does not appear in field (e.g., as a warranty claim). The term "remedied" may indicate that a defect that is detected and fixed. It may also indicate that a defect that is detected but is never fixed because the defect is so minor that customers do not care. While the term "captured defect" is used for convenience herein, it is to be understood that quality data items other than defects may be captured, and the systems and methods described herein may be applied equally to any type of quality data item.

Defect Matching Rule: Any rule that identifies one or more types and/or values of quality data items that may be indicative of a defect. Defect matching rules may include one or more types and/or values of internal quality data items, one or more types and/or values of external quality data items, or one or more type and/or values of both internal and external quality data items. For example, a given defect matching rules may identify a type or value of internal quality data item and a type or value of external quality data item. This example defect matching rule may be applied to a set of quality data to determine if any given unit of production is associated with both an internal quality data item of the identified type or value and an external quality data item of the identified type or value. If so, the given unit of production is considered to satisfy the defect matching rule. Satisfying only an internal quality data item of a defect matching rule may indicate an "internal defect" or a "captured defect". Satisfying only an external quality data item of a defect matching rule may indicate an "external defect" or an "undetected defect". Satisfying both an internal and an external quality data item of a defect matching rule may indicate an "uncaptured defect."

III. Example Search Portal

FIG. 1 illustrates an example interactive graphical user interface (GUI) 100 of the database system. For convenience, the interactive graphical user interface 100 and a number of other interactive graphical user interfaces described below are referred to as being part of a quality investigation portal search screen portion of the database system. The Explorer search screen portion of the database system can perform a global search based on one or more types and/or values of internal (e.g., in-plant) quality data items and/or one or more types and/or values of external (e.g., in-field) quality data items. A global search is a search not restricted by an established link. Established links are described below. A quality data item is information associated with a defect on a unit of production. Repair Location(s) 108, Failure Type(s) 112, etc. are examples of types of quality data items. The "repair location #1" in box 108 and "Failure Type #1" in box 112 are examples of values of quality data items. Quality data items can include information on what (e.g., defective component, product model, product ID, etc.), where (e.g., the location where defect was found, the location where malfunctioning occurred, the location where the faulty component was assembled into the product, etc.), when (e.g., the time (time, date, workweek, etc.), when a defective component was assembled into the product, the time when a defect was discovered, etc.), who (e.g., a person discovered or reported a malfunction, a team responsible for inspecting a particular component, a person in the sales channel, etc.), how (e.g., a description of malfunction, consumer perception in a response to a survey question, etc.), and why (e.g., a root cause of a defect, a reason for a warranty claim, etc.).

As illustrated on the screen 100, an implementation of a search function of the database system may include external quality data types such as Problem Category(ies) 104 (e.g., warranty problem term or description), Repair(s) 108 (e.g., a manufacturing step to repair a warranty claim, or what was repaired), failure types (e.g., the symptom of the defect) 112, failure parts 114, and other information. An implementation of the search screen of the database system may include internal quality data types such as In-Plant Fix Problem(s) 116, product version information such as model number 136, and other information. The search function of the database system can accept search criteria based on an arbitrary combination of types and/or values of external quality data items and/or types and/or values of internal quality data items. The search can include a date search range 132. The date search range can include a start date and an end date. The date search range 132 can be based either on the date the items was produced and/or the date the quality defect was found. The search function of the database system returns search results including all product IDs/unique identifiers (e.g., UIDs) which meet the search criteria, together with external quality data items and internal quality data items associated with these product IDs. Thus, a search may be based on one or more internal quality data type/value pairs, the search results can comprise all product IDs having internal quality data items matching the one or more internal quality data type/value pairs, as well as external and internal quality data items associated with the product IDs. Similarly, a search may be based on one or more external quality data type/value pairs, or a combination of one or more internal quality data type/value pairs and one or more external quality data type/value pairs.

Figure 3:
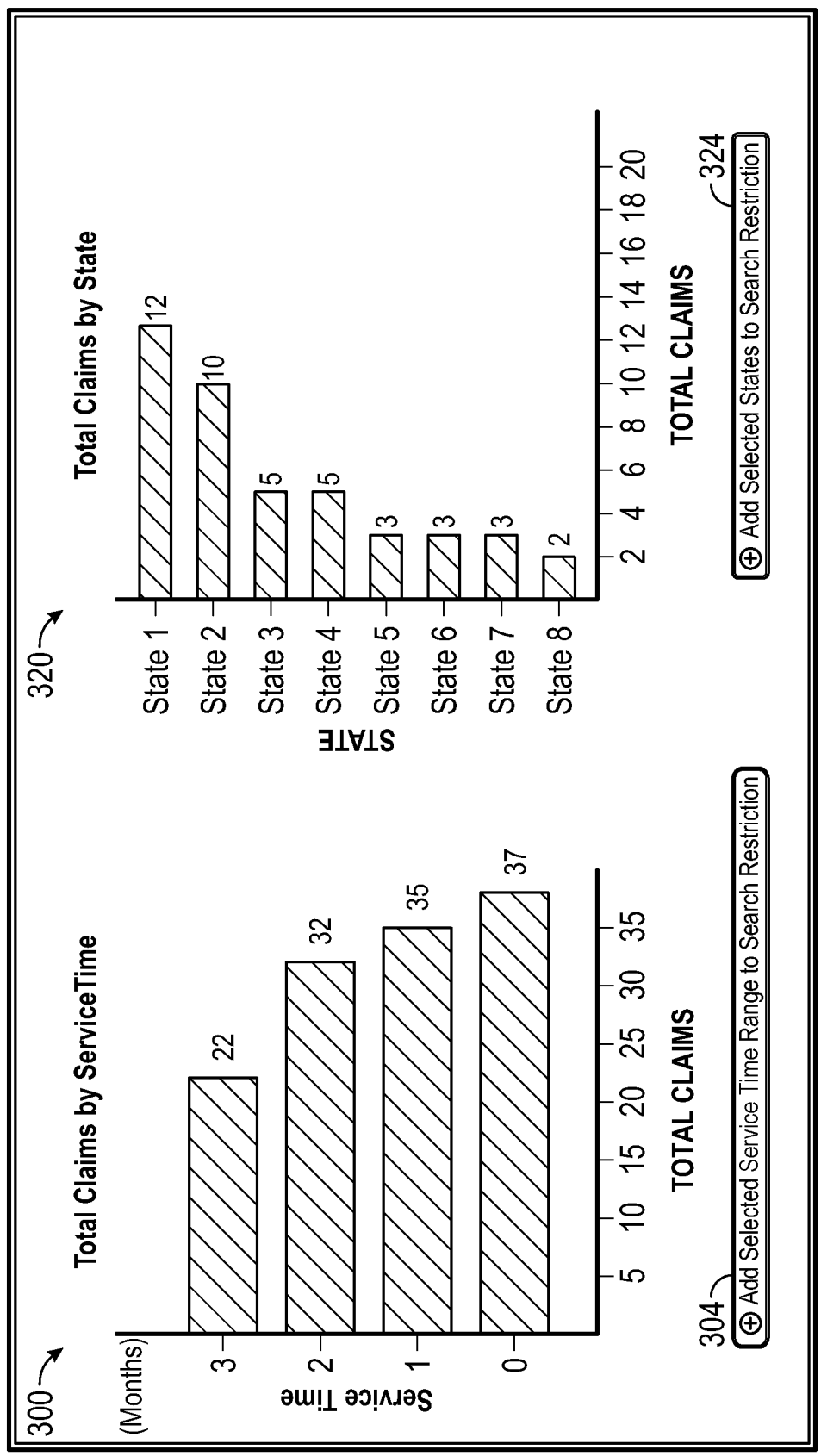
FIG. 3 illustrates a presentation of a global search result of warranty claims with respect to two different external quality types.

Upon performing a search, the search function of the database system may present a global search result in a number of ways. FIGS. 2 and 3 illustrate three examples. FIG. 2 shows a GUI chart 200 which plots the total number of warranty claims by widget build date. The vertical axis, labeled "TOTAL UIDs" 204, denotes the total number of units of production (widgets in the illustrated context) for which a warranty claim has been made, e.g., the product IDs meeting the global search criteria in FIG. 1. The horizontal axis 208 denotes a span of time, from October 2014 through September 2015 according to a search criterion Dates 132 in FIG. 1. The chart displays four numbers at the top. Total UIDs 216 represents the number of UIDs (as an example of product IDs) that meet the search criteria on search screen 100. The other three numbers, Total Claims (the total number of warranty claims made) 212, Repair Descriptions (e.g. free text descriptions describing how the product was repaired) 220, and UIDs with Customer Survey 224, are information associated with these UIDs. A particular result (e.g., a claim, a repair description) in these three numbers may not meet the search criteria in search screen 100. Chart 200 provides a graphical representation of warranty claims relative to product manufacturing date. Chart 200 can allow a user to quickly spot a trend of quality control problems relative to product manufacturing date. Chart 200 can provide user interactivity, for example, permitting a user to click and drag to change the range of dates, or click into a particular date or range of dates. An embodiment can update the search criteria on search screen 100 according to the user's input.

FIG. 3 includes two more examples of global search results in graphical presentations according to an implementation of the present disclosure. GUI chart 300 plots Total Claims by Service Time in a bar graph. This can enable a user to visualize initial quality of a product relative to its age after manufacture, e.g., in service. A user can select one or more bars (Service Time Ranges) in the bar graph 300 and click on icon 304 to add selected Service Time Ranges to global search criteria. The search function of the database system can automatically update the global search criteria to include the added restriction, for example by automatically updating the Service Range selector 144. Chart 320 plots Total Claims by State in a bar graph. This can enable a user to visualize quality issues relative to placement of products. For example, transportation problems or climate conditions may cause product quality issues in a particular geographical region. A user can select one or more bars (States) in the bar graph 320 and click on icon 324 to add selected States to global search criteria. The search function of the database system can automatically update the global search criteria to include the added restriction, for example by automatically updating the State(s) selector 140.

Figure 4:
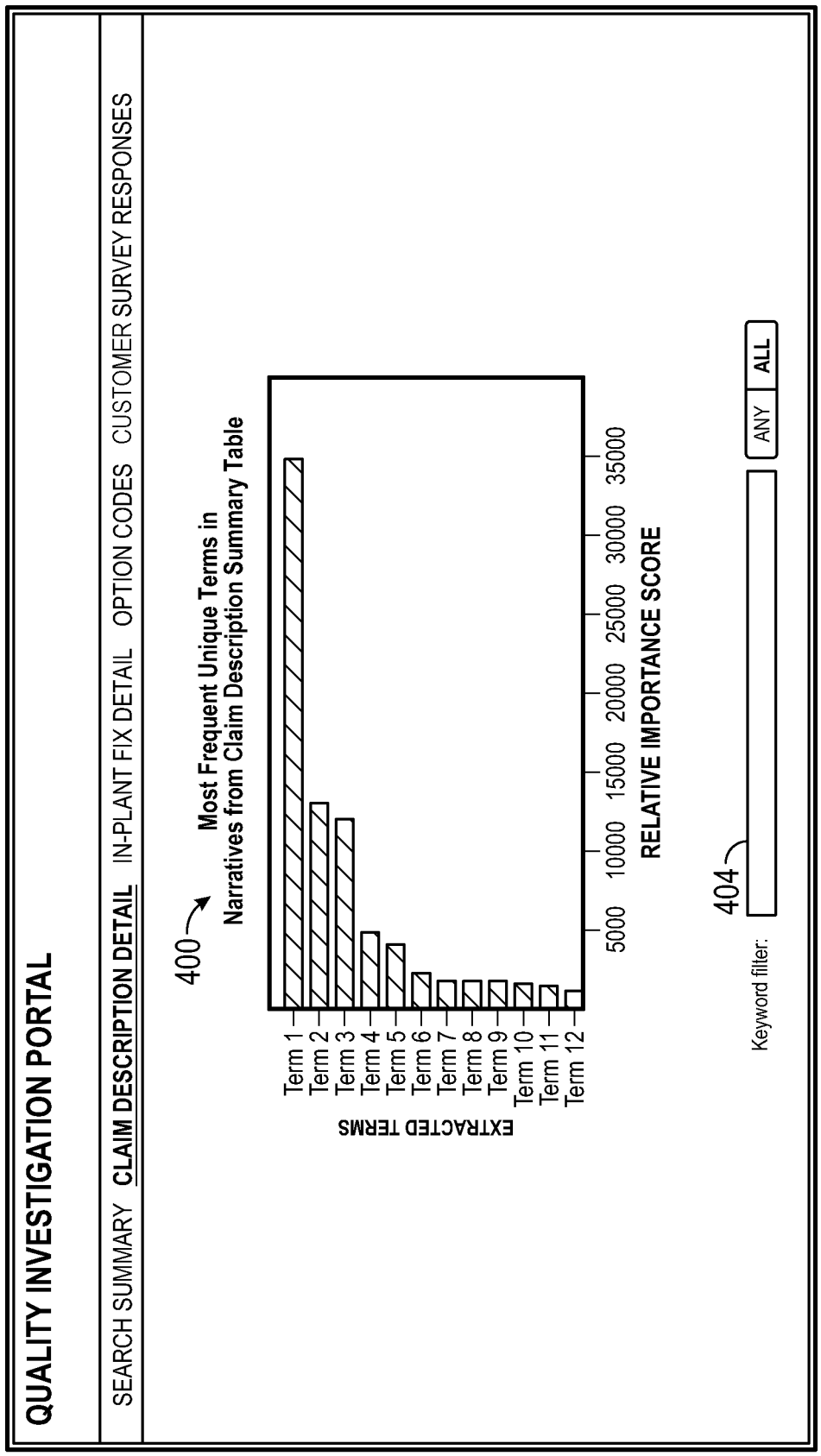
FIG. 4 illustrates a presentation of most frequently occurring terms in a global search result.

FIG. 4 illustrates a presentation of an in-field quality data, Claim Description Detail in an embodiment of the system. Warranty claims may contain repair descriptions, e.g., customer descriptions of the problem which led to a warranty claim. A quality investigation portal can search Claim Description data and provide a visual representation of most frequently occurring terms in the Claim Description data, for example as shown in GUI chart 400. A user can select one or more terms as additional global search criteria. The search function of the database system can facilitate this addition by, for example, automatically populating Keyword filter box 404 with the selected terms.

FIG. 5 illustrates a partial example Claim Description Summary Table for Search Results 500. Different columns of the table contain various external quality data types, e.g., those described in connection with FIG. 1. The rows in GUI table 500 can represent the search results from applying search criteria entered on search screen 100, further narrowed by the Keyword filter box 404. Table 500 can allow a user to see detailed information on warranty claim according to global search criteria and additional filters that the user has entered or selected. A user can select a particular entry in the table (for example, Failure Type #1 of Claim #1 504 or Repair Location #2 of Claim #2 508) as an additional search criterion to further narrow the search. The search function of the database system can automatically populate Keyword filter box 604 in FIG. 6 to add the additional search criterion.

FIG. 6 illustrates an example In-Plant Fix detail GUI screen 600. In-Plant Fix problems are quality problems or defects identified and fixed by the manufacturer, e.g., in plant during manufacturing. A defect may be detected and fixed at a quality check point during manufacturing. Detection and repair of a defect during manufacturing can each generate one or more internal quality data items associated with the product ID which has the defect. A goal of quality control is to detect and fix defects as early as possible to keep the cost associated with defects low. A defect detected in the field (e.g., by a consumer) can be costly to repair, replace (a unit of production), or refund (for the purchase). Similarly, a defect detected later in the assembly process can be more costly to repair than if detected earlier in the process. In general, a goal of the manufacture process is to detect defects as soon as possible after their creation, in order to keep repairs efficient and cost-effective. A defect detected in the field can have an additional negative effect of harming a manufacturer's reputation for quality products. A system according to the present disclosure can advantageously facilitate the association between related internal and external quality data, thereby assisting a manufacturer to identify internal quality issues that translate to costly warranty repairs, replacements, or returns.

In an example implementation, the search function of the database system can generate an In-Plant Fix problem table 612 from the global search results based on criteria entered on the search screen 100, and further narrowed by Keyword filter boxes 404 and 604 and problem type selection boxes 608. The ability of using a keyword filter associated with Claim Description detail (an external quality data item) to filter In-Plant Fix problems (an internal quality data item) is one example of an implementation supporting the advantageous association between related internal and external quality data items, as described above. As illustrated in FIGS. 4 and 6, Keyword filter boxes 404 and 604 are empty and all problem type boxes 608 are selected. Thus, Resulting UID Count column 616 show 76 (UIDs), the same number as Total UIDs 216 in FIG. 2. The number of entries (2,229) shown in 628 represents the number of internal quality data items associated with all product IDs (the 76 UIDs) in the search results.

In FIG. 7, a Keyword filter "WIDGET A" is applied in box 704. An implementation applies this additional criterion as a filter. As a result, Description #1, #2, etc. in column In-Plant Fix Description 732 all contain the word "WIDGET A" (not shown), and the number of entries in the search results decreases from 2,229 (shown in 628) to 125 (shown in 728). A keyword filter permits a user to enter an additional search criterion to further narrow the search results based on the user's interest.

If the same or a related quality issue shows up both in a warranty claim and in a In-Plant Fix event on the same product ID, it may be an indication that the fix during manufacture, e.g., in-plant fix, was not properly done or deficient in some way. This can represent a serious quality control problem and an opportunity for quality improvement. Thus, associating In-Plant Fix problems with external quality data can be very useful to quality improvement. The search function of the database system can allow a user to select one or more In-Plant Fix problems as additional global search criteria (box 624). The search function of the database system can allow a user to select one or more In-Plant problems as problems of interest to further focus the user's attention (box 620). The search function of the database system can automatically populate box 736 with user-selected In-Plant Fix problems of interest.

FIG. 8 illustrates a Resulting In-Plant Fix Problems Full Detail table 800. GUI table 800 lists quality data which can result from a global search and additional filtering as described above, and further narrowed by Relevant In-Plant Fix Problems box 736, if it contains any entries. For example, as illustrated through 864, 16 UIDs out of 76 UIDs (216 in FIG. 2) meet the aggregated search criteria. Aggregating a plurality of search criteria can permit a user to focus quickly on problematic areas of quality control. Table 800 lists external quality data items (e.g., warranty information) and internal quality data items (e.g., quality check point information such as sign-off data). As illustrated through an implementation, data columns UID 808 through Claim Repair Description 820 contain external quality data items; data columns Prob ID 824 through Signoff zone 848 contain internal quality data items. Side-by-side listing of external and internal quality data items can facilitate easy association of external quality data items with related internal quality data items.

Table 800 lists combinations of external quality data items and internal quality data items on a product ID (e.g. UID as illustrated) basis. External quality data items meeting aggregated search criteria for a particular product ID are listed together with internal quality data items for the same product ID meeting corresponding aggregated search criteria. As all combinations are represented in the table, some combinations represent genuinely related internal and external quality data items, while some combinations represent incorrectly combined internal and external quality data items. When a user recognizes a genuine relationship between an external quality data item and an internal quality data item in the same row, the user can establish a link by checking box 804 in that row, thereby identifying an uncaptured defect. A user can establish a link via other parts of the system, e.g., defect matching rules discussed below in connection with FIG. 13. An implementation of the database system can allow links to be established in other ways, e.g., entry of pre-established links in a data store based on links established for a similar manufacturing setup. This link can represent a confirmed association between a particular external quality data item and a particular internal quality data item. Uncaptured defects can represent problematic areas of quality control, e.g., an internal quality check or fix failed to address a quality issue adequately to prevent an external quality event (e.g., a warranty claim) from occurring. Thus, identification of uncaptured defects can advantageously provide data on opportunities for quality improvement. An implementation can perform search, filtering, and/or data presentation based on uncaptured defects using confirmed links. The rightmost column "Marked?" 860 shows whether a link has been established between the internal and external quality data items on the same row, whether by the current user or by a previous user. Through supporting links of confirmed associations and maintaining such links, an implementation can help identify uncaptured defects and pinpoint quality control problem areas. For example, repair location #1 (in column 812) can be linked to a team of employees (in column Prob Dept 836) in charge of the defective component under warranty repair.

FIG. 9 illustrates an example Warranty/In-Plant Fix Pivot Table 900. Table 900 shows warranty repair quality parameters along with presence or absence of confirmed associations (e.g., uncaptured defects as Marked 912 or a detected defects as Unmarked 916). Marked events/uncaptured defects are those external warranty events with confirmed associations to their respective internal quality data items. Uncaptured defects can represent candidates for quality control improvement in defect repair because their corresponding quality issues are identifiable (or identified) during manufacturing, but the in-manufacturing remedy appears incorrect or inadequate in some way. Undetected defects can represent candidates for quality control improvement in defect detection because their corresponding quality issues were not identified during manufacturing. Rows of GUI table 900 may represent quality data items at different levels of granularity, for example, all Repair Locations and all Failure Types 932 (resulting from global search criteria and additional filters as described above), all Failure Types for a particular Repair Locations 936, all Repair Locations s for a particular Failure Type (not shown), a particular Repair Locations s and a particular Failure Type 944. The presence or absence of confirmed associations (Marked/Unmarked) are further presented as a percentage of the Total 920 in columns 924 (Marked %) and 928 (Unmarked %). This information can permit a user to easily detect a particular quality control problem, e.g., rows with a high percentage of Marked defects. For example, in table 900, row 944 has a Marked percentage of 67%. Role 944 represents a prime quality improvement target as 67% of failures were detected but not properly fixed during manufacturing.

Figure 10:
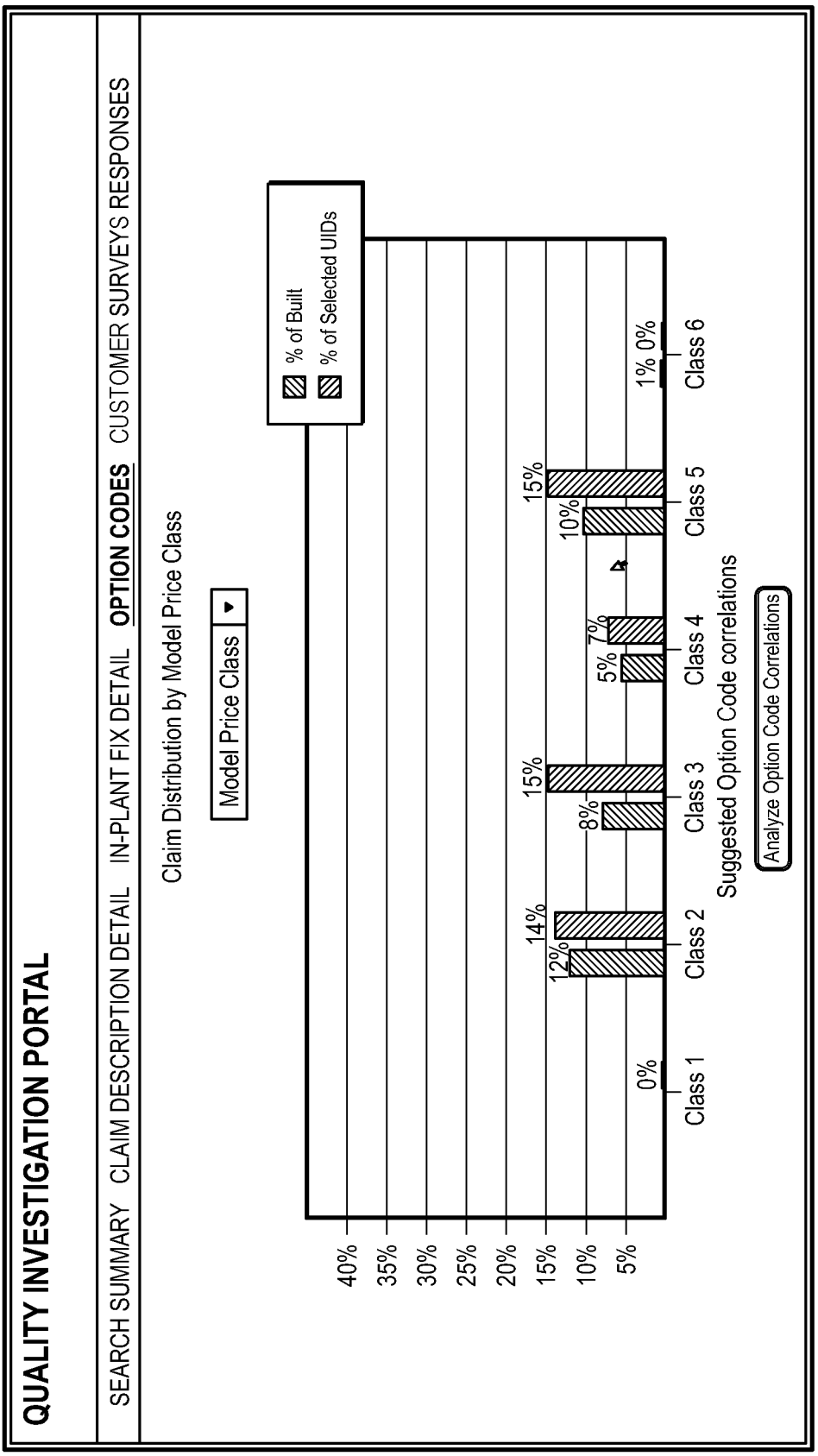
FIG. 10 illustrates an example chart showing claim distribution by model price class.

FIG. 10 illustrates a Claim distribution by Model Price Class chart 1000. A product line may be divided into different classes based on features, components, accessories, etc. For a class of products, GUI chart 1000 plots its percentage relative to the total volume the product line (% of Built) and its percentage relative to the claims of selected UIDs (illustrated as % of Selected UIDs). Chart 1000 can permit a user to quickly detect any quality control problems in a particular class of products. The chart can also show the user the option codes with the most statistically significant difference between the build percentage (% of Built) and claim percentage (% of Selected UIDs). For example, Class 3 as illustrated represents 8% of the total product line volume but represents 15% of the total populations of selected product IDs. A user may conclude based on the data that there is a certain quality control problem associated with Class 3 such that it has a quality event percentage almost twice of its production population. The user can select Class 3 for further analysis. The option code associated with Class 3 can be most likely related to the claims the user has searched for.

FIG. 11 illustrates an example option code correlation analysis GUI. Column 1104 shows option code associated with search results. Column 1108 shows the number of product IDs "in Selection," e.g., product IDs in a data subset resulting from global search criteria and additional filters. Column 1112 shows a particular option code as a percentage of the selected population. Column 1116 shows a particular option code as a percentage of total population of the product line. Column 1120 shows the difference between columns 1112 and 1116. Column 1124, Min Log Odds Ratio, represents a measure of quality control problems on a per-sales-code basis. A higher ratio can represent a higher likelihood that there is a relationship between the option codes and the observed data.

IV. Example Defect Manager & Heat Map

FIG. 12 illustrates a Defect Manager GUI in an implementation according to the present disclosure. A user can use Defect Manager to establish association between internal quality type/value pairs and external quality type/value pairs. A Defect Manager can permit a user to establish associations by selecting a species of defect via user interface (UI) 1304. Defects associated with a particular product may be listed. The list can be filtered by search criteria, for example, a keyword filter 1308, a source station 1312 (e.g., the manufacturing station at which a defective part is assembled, inspected, produced, etc.), etc. A user can select a species of defect from the list, for example, by checking a box 1316. The implementation can display information and/or allow the user to enter or update information about the selected defect on UI 1320. Another UI 1340 can permit a user to select or enter internal quality values (e.g., for quality type In-Plant Fix problems) associated with the selected defect. UI 1360 can permit a user to select or enter rules, e.g., quality type/value pairs, to associate the rules with the selected defect and the selected or entered internal quality values. Such rules can include external quality types such as repair locations, Failure Types, Failure Parts, keywords, etc., and values associated with the defect as illustrated in FIG. 13. A user can use Defect Manager to create confirmed associations between an internal quality type/value pair and an external quality type/value pair. The defect links internal and external quality type/value pairs, as configured by the user. An implementation can present internal and external quality data based on a selected defect and its linked quality type/value pair (established through UI on FIG. 13) and/or links established through the search function of the database system (as described in connection with FIG. 8).

FIG. 13 also illustrates a Defect Manager GUI in an implementation according to the present disclosure. A user can use Defect Manager to monitor data associated with defects. Defects associated with a particular product may be listed. A Defect Manger can permit a user to view stale defects via UI 1370. Stale defects can be defects associated with internal quality data that have not been used in the past 30 days. The list can be filtered by search criteria, for example a keyword filter 1372, a source station 1374. A user can also view new defects via UI 1380. New defects can be defects associated with internal quality data that have been added in the past 30 days. By comparing the stale defects and new defects, the user can update defect matching rules accordingly.

Figure 14:
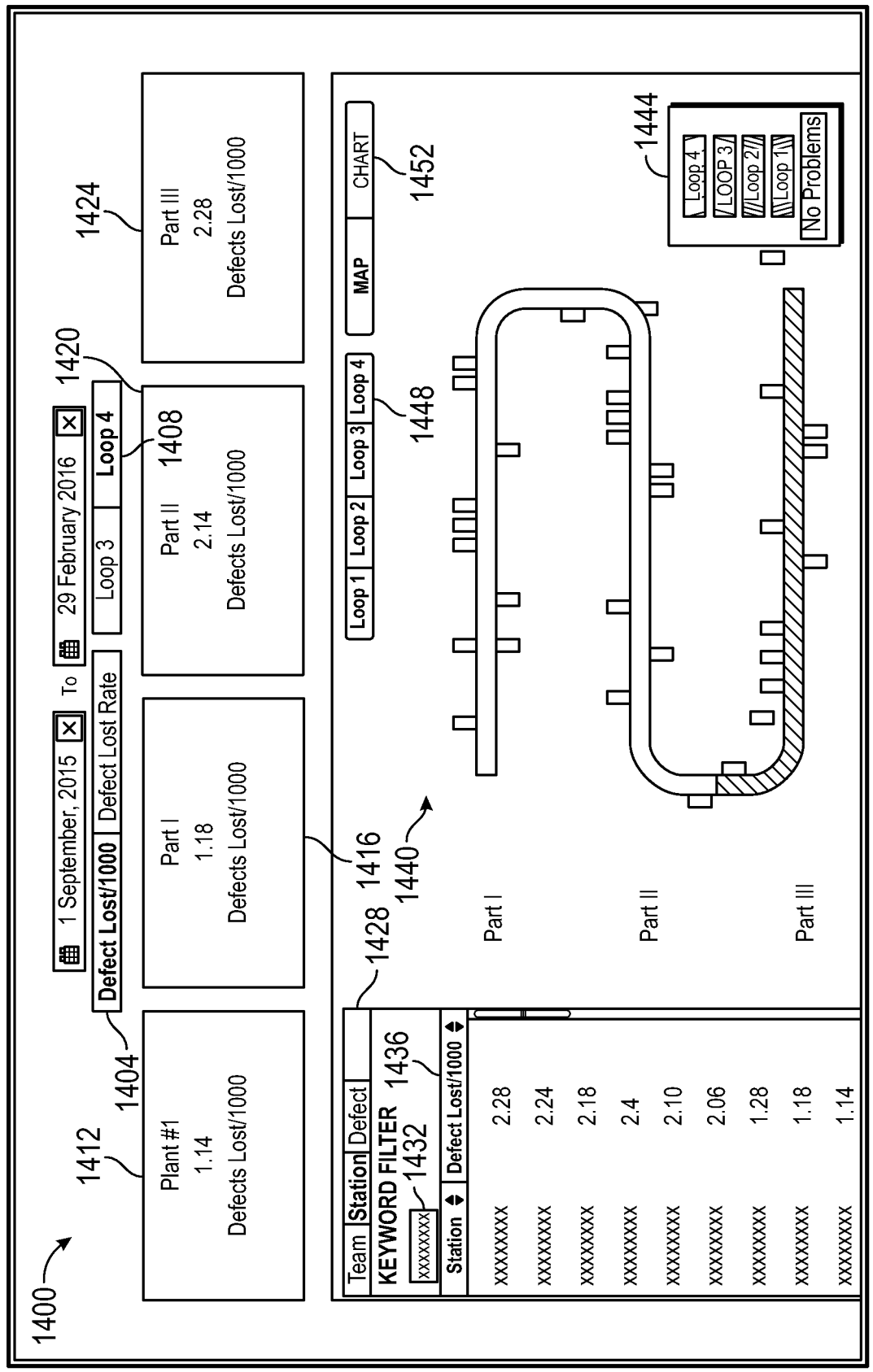
FIG. 14 illustrates an example heat map.

FIG. 14 illustrates an example Heat Map GUI implementation of a quality control database system. Quality metrics may be displayed, for example, as "Defect Lost/1000" or "Defect Loss Rate," as selected via a UI selector 1404. Defect Lost/1000 can represent the number of warranty claims per 1,000 units of production. Defect Loss Rate can represent the percentage of defects, including undetected or uncaptured defects, found in the field. Both are described in more detail below in connection with FIG. 19. An overall plant quality metric is shown in box 1412. For example, Plant #1 is illustrated to have 1014 defect loss/1000. A plant may have major manufacturing divisions. The quality metric for different divisions may be separately displayed, allowing a user to quickly see the quality metric for a particular manufacturing division. For example, an automotive plant may be divided into three manufacturing divisions: Part I, Part II, and Part III. The quality metric for each manufacturing division can be displayed, for example in boxes 1416, 1420, and 1424. An implementation may permit a user to redraw a heat map 1440 for a particular manufacturing division by selecting a corresponding box, e.g., 1416, 1420, or 1424.

Heat map 1440 shows manufacturing stations in a manufacturing plant, which can be based on the floor plan of an assembly line (or production line) the plant. A manufacturing station is shown in a shaped element (e.g., a square, a rectangle, a circle, etc.) along the assembly line. A manufacturing station is displayed according to legend 1444. Legend 1444 shows Loops 1, 2, 3, and 4. These loops can represent various quality checkpoints. Each increasing loop number can represent a later quality checkpoint in the manufacturing/warranty claim cycle. For example, loop 1 may represent defects found and corrected at the station of installation of a particular part; loop 2 may represent defects found and corrected at the subassembly quality checkpoint; loop 3 may represent defects found and corrected at a final manufacturing quality checkpoint; loop 4 may represent defects found in the field (e.g., through a warranty claim), feedback from the field (e.g., through consumer or sales staff surveys), etc. An undetected defect is represented by loop 4 warranty claim data item without internal quality data item associated with loop 1, 2, or 3 for a same product ID. An uncaptured defect is represented by loop 4 warranty claim data item together with internal quality data item associated with loop 1, 2, or 3 for a same product ID. A captured defect is represented by internal quality data item associated with loop 1, 2, or 3 without loop 4 warranty claim data item for a same product ID. The heat map can visually represent loops through different colors, patterns, shadings, etc. For example, loop 4 can be represented by a red color, which is commonly associated with a signal to stop or a hot temperature; loop 1 can be represented by a green color, which is commonly associated with an okay-to-proceed signal, or a blue color, which is commonly associated with a cool temperature. Through judicious choices of colors, patterns, shadings, etc., a heat map can more readily create a perception in a user's mind where problem areas (of quality control) are on the map.

A configuration of an implementation can designate a manufacturing station according to the highest loop number (representing the latest quality check point) for which a defect is found and for which the checkpoint is involved. For example, if a manufacturing station or a checkpoint is associated with loop 1 and loop 3 defects, the manufacturing station or checkpoint can be shown as loop 3. Another configuration can designate a quality checkpoint proportionally to the numbers of defects associated with the different loops. For example, if a station or a check point is associated with a defect which is detected in loop 2, 3, and 4 at rates of 20%, 50%, 30%, respectively, an implementation can apply colors/patterns/shadings according to the 20%/50%/30% proportions. Yet another configuration can designate a quality checkpoint based on the different loops for which a defect is found which is associated with the checkpoint, without regard to proportionality. Other configurations are possible. A later discovery of a defect usually translates to a higher cost of repair. Thus it can be advantageous to improve rate of early discovery and successful repairs of defects. By visually representing the highest cost repairs associated with a particular quality checkpoint, an implementation according to the present disclosure can help a user to quickly visualize quality checkpoints with quality control issues in a manufacturing environment. For example, manufacturing stations designated as loop 4 can be prime candidates for quality improvement actions because they are associated with defects found in the field.

A loop selector UI 1448 can allow a user to display only the manufacturing stations within the selected loop or loops. A map/chart selector 1452 can switch the display between a heat map 1440 and a heat map bubble chart, which is described below in connection with FIGS. 19 and 20.

UI selector 1428 a can permit a user to change a ranked list 1436 based on a quality type of interest, for example, on a per-station basis, on a per-defect basis, etc. In the illustration, a per-station basis is selected through UI selector 1428. In response, the ranked list 1436 shows manufacturing stations according to their respective Defect Loss/1000 performance. Keyword filter input box 1432 can permit a user to enter additional keywords as search criteria for filtering the ranked list 1436.

Figure 15:
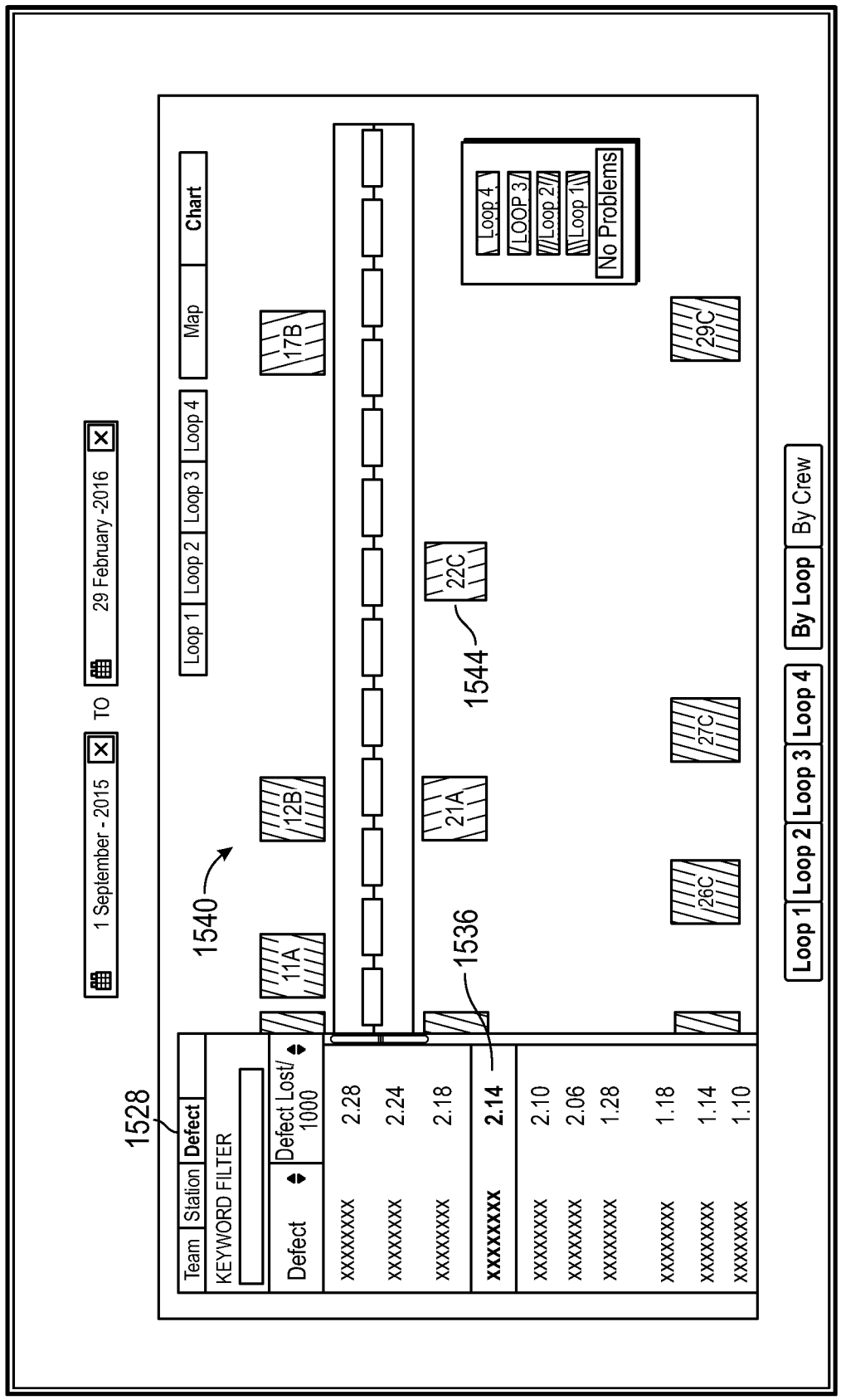
FIG. 15 illustrates an interactive aspect of an example heat map.

FIG. 15 illustrates how a heat map GUI implementation can facilitate a quality control investigation. A user selects a per-defect basis in the UI selector 1528. The user further selects a particular defect of interest 1536. The heat map 1540 is zoomed in, showing a manufacturing station 1544 associated with the defect of interest. An implementation can further permit a user to click through or into a manufacturing station for a display of quality or manufacturing information associated with the manufacturing station and/or the defect, for example.

Figure 16:
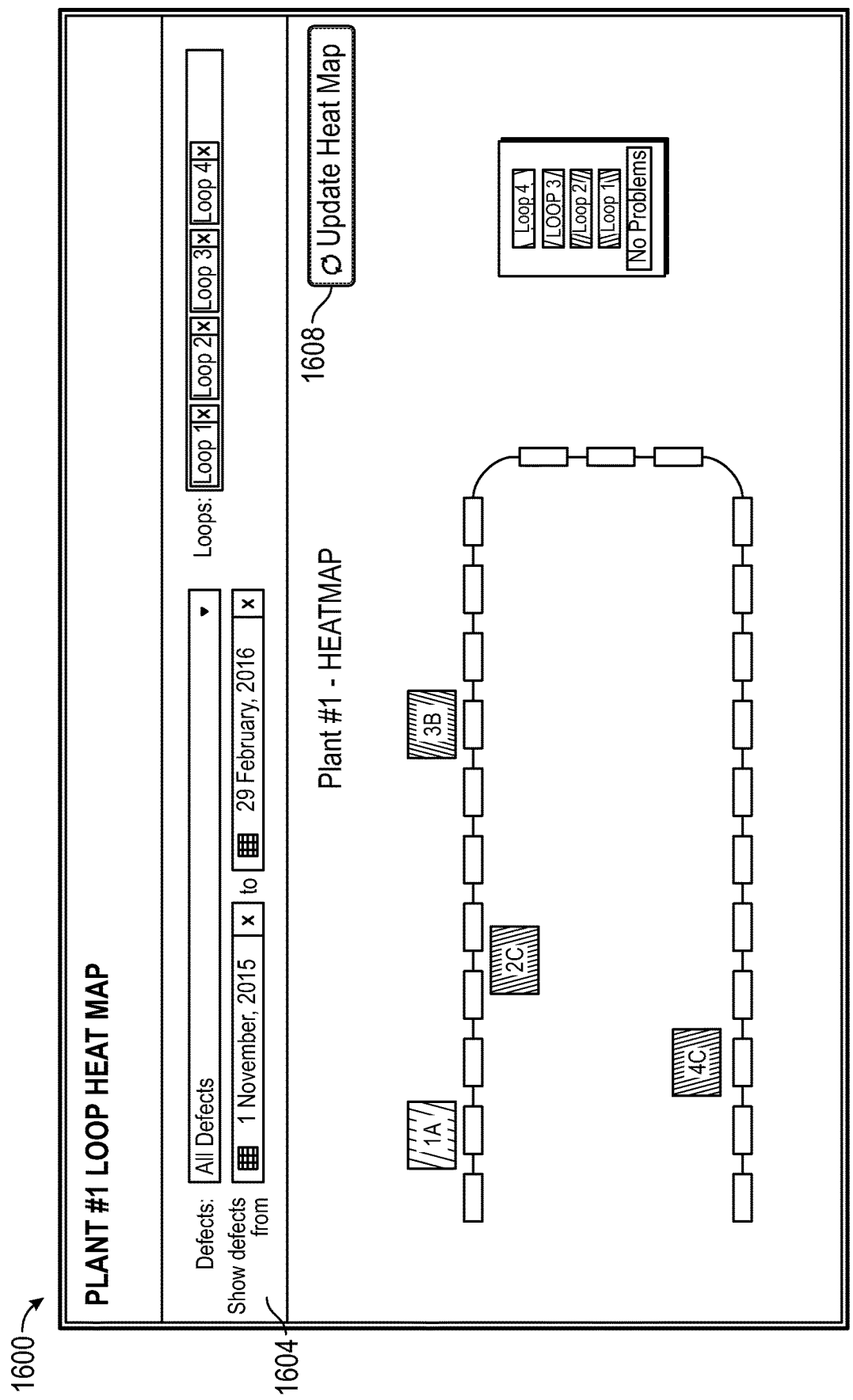
FIG. 16 illustrates an example heat map with a UI filter.

An implementation can provide a data search criteria for inclusion in a heat map GUI as illustrated in FIG. 16. A UI selection box 1604 can be used to input or select one or more defects, one or more loops, and/or a date range (e.g., of manufacturing) for inclusion. The one or more defects input or selected via UI 1604 can be a filtered subset of defects, for example, as filtered through keyword filter 1432. An "Update Heat Map" icon 1608 can be used to invoke an update to the heat map 1600. In response, the implementation updates the heat map based on selection entered in box 1604.

Figure 17:
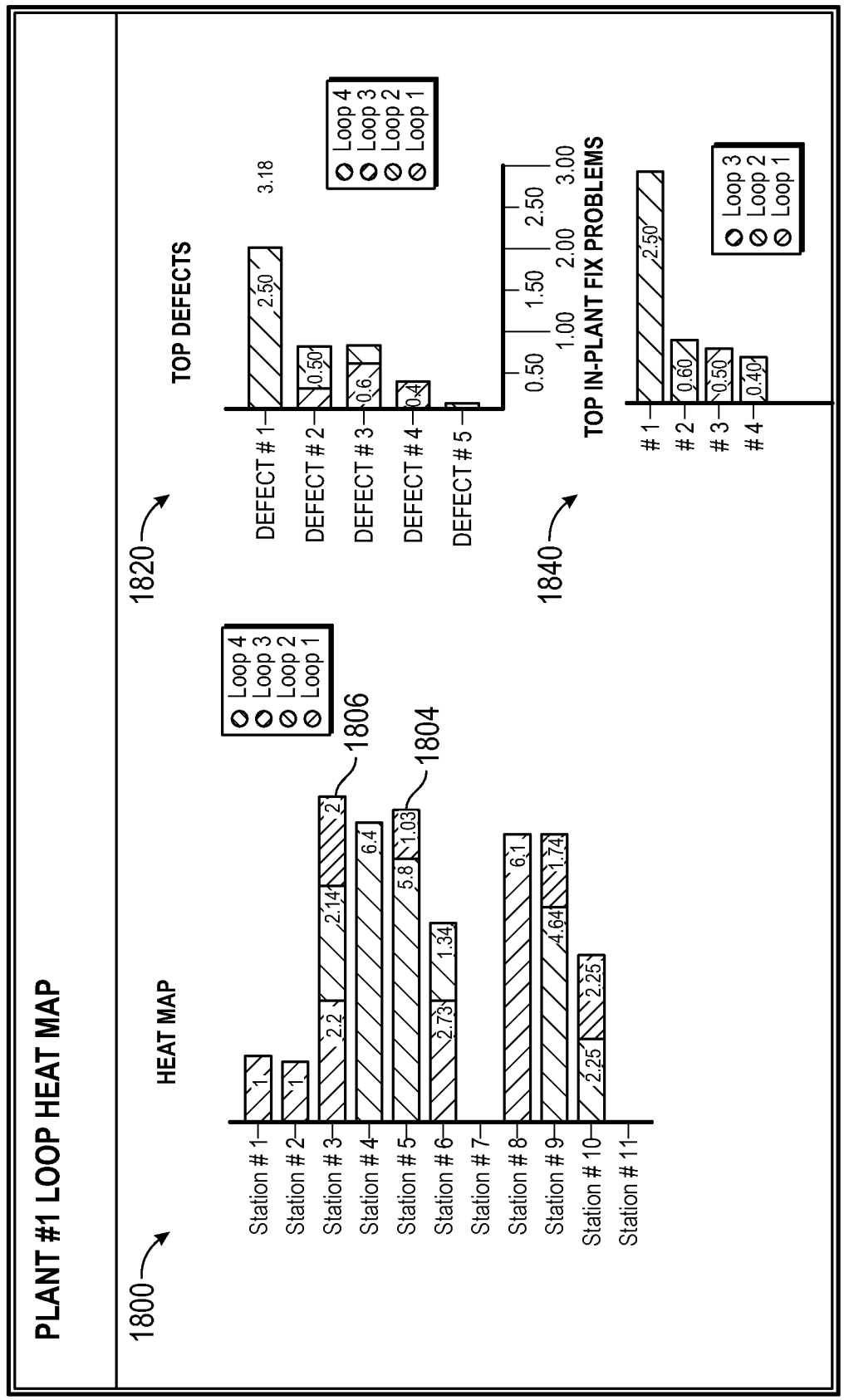
FIG. 17 illustrates an example heat map in bar charts.

FIG. 17 illustrates another example presentation of a heat map GUI. Bar charts 1800 presents a heat map. Similar to FIG. 14, the heat map can visually represent loops through different colors, patterns, shadings, etc. Each bar in the bar charts can be divided into sections based on the associated loop number. For example, the bar 1804 shows 1.46 defects (per 1,000) in loop 1, 4.41 defects in loop 2, and 1.03 defects in loop 3. A user may choose to further investigate a bar with the longest loop 4 section, the longest bar, etc., depending on the user's interest. Bar charts 1820 and 1840 present a ranked list of top defects and a ranked list of top In-Plant Fix problems, respectively. Bar charts 1820 and 1840 can use the same color/pattern/shading scheme as the heat map. Bar charts 1820 and 1840 can allow a user to see the most frequently occurring defects and In-Plant Fix problems and can enable the user to focus on the most problematic areas of quality control. In an example of implementation, because a goal of the user is to detect defects as early in the process as possible, the user may aim to have the Loop 1 the largest, followed by Loop 2, followed by Loop 3 and then Loop 4, for example, bar 1806. An implementation can support further investigation by allowing a user to bring up associated quality data by clicking through a bar of interest, for example bar 1804.

Figure 18:
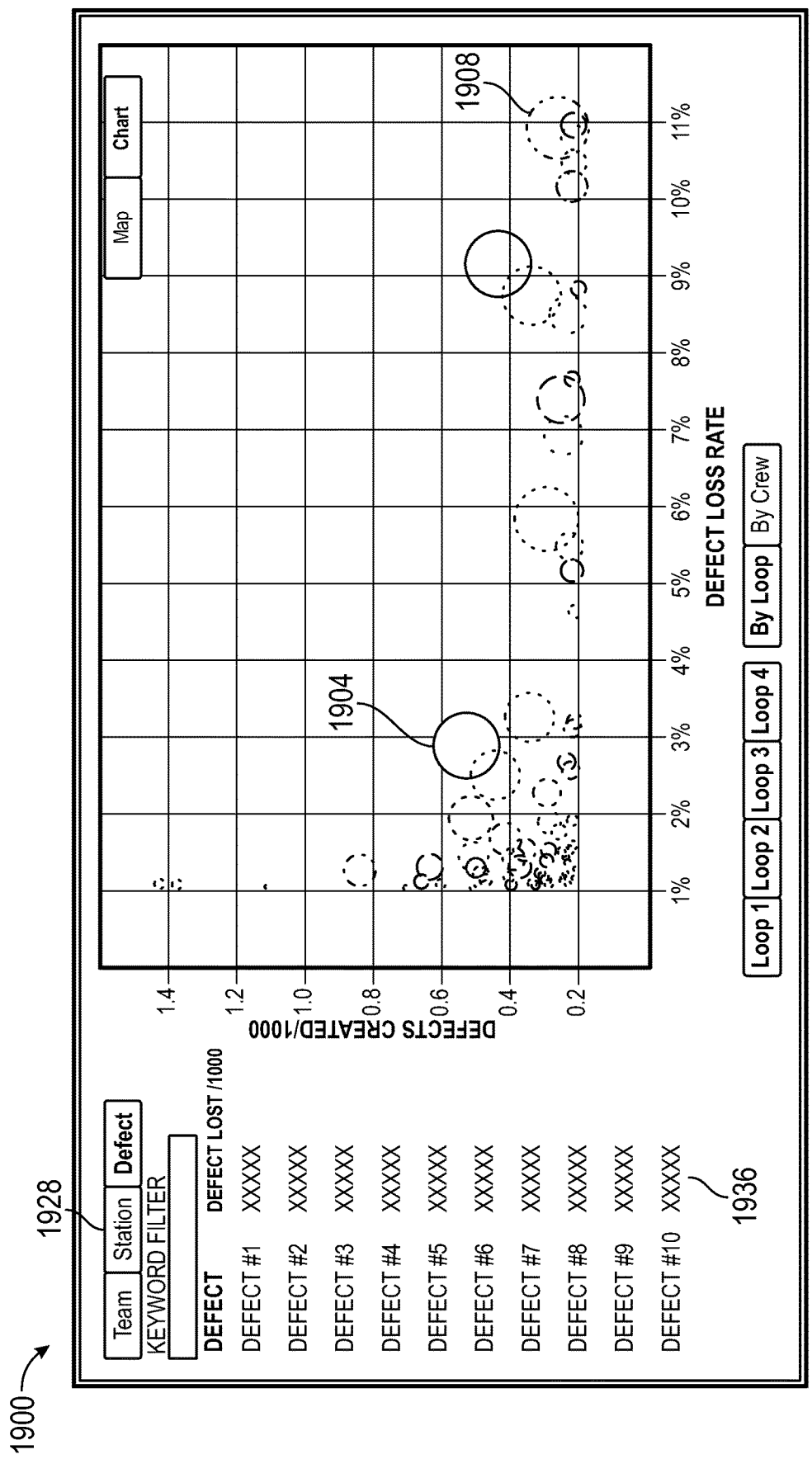
FIG. 18 illustrates an example heat map in a bubble chart.

FIG. 18 shows an example heat map GUI in the form of a heat map bubble chart 1900. The horizontal axis of chart 1900 represents Defect Loss Rate. The vertical axis represents the number of Defects Created/1000 widgets built. As illustrated, each bubble represents defect data associated with a particular defect, which is selected through UI 1928 and shown in the table 1936. The Defect Loss Rate can represent the rate of uncaptured and/or undetected defects, defects found in the field and which may have related warranty claims. These are defects found but not properly fixed during manufacturing. Thus, bubbles appearing toward the right side of chart 1900 represent problems defects which may not have been repaired correctly or found during inspection. The number of Defects Created/1000 represents a combined number of defects, whether found in-plant or in-field, for every 1,000 units of production. Thus, bubbles appearing toward the upper side of chart 1900 represent more frequently occurring defects. The size of a bubble can represent a frequency of warranty claims (external defects) for a corresponding defect (e.g. Defect Loss/1000, displayed in table 1936). In some embodiments, because warranty claims can be expensive to repair, the size of a bubble can represent cost associated with a defect.

Since warranty claims are costly to a manufacturer, a user can prioritize quality improvement efforts by directing efforts to those defects represented by the largest bubbles (and at or near the top of table 1936), e.g. bubbles 1904 and 1908. The placement of the bubbles can indicate how quality improvement efforts can be effectively directed. For example, bubble 1908 is low on the vertical axis but has a high value on the horizontal axis. Thus, bubble 1908 represents a defect which has a low occurrence rate but a high defect loss rate. Thus, quality improvement efforts to reduce defects represented by bubble 1908 can be focused on improving repair of the defect during manufacturing or improving inspection to find undetected defects. As another example, bubble 1904 is relatively high on the vertical axis and relatively low (toward the left) on the horizontal axis. Thus, quality improvement efforts to reduce defects represented by bubble 1904 can be focused on reducing the occurrence rate of the defect.

An implementation can plot bubble charts with respect to different contexts. UI selector 1928, for example, can be used to select among Defect, Station, etc. If Station is selected, for example, each bubble represents defect data associated with a manufacturing station. Thus, similar to the explanation above, bubbles appearing toward the right side of chart 1900 represent manufacturing stations which may have quality control problem in terms of fixing or detecting defects found in manufacturing. Bubbles appearing toward the upper side of chart 1900 represent manufacturing stations which may have quality control problem in terms of introducing defects into the product. Such a bubble chart can help direct quality improvement efforts to a manufacturing station associated with a large number of warranty claims based on the bubble size. Such a bubble chart can further help direct quality improvement efforts into improving in-plant repairs, improving quality checks or reducing defect occurrence rate at the station based on the placement of the bubble.

Figure 19:
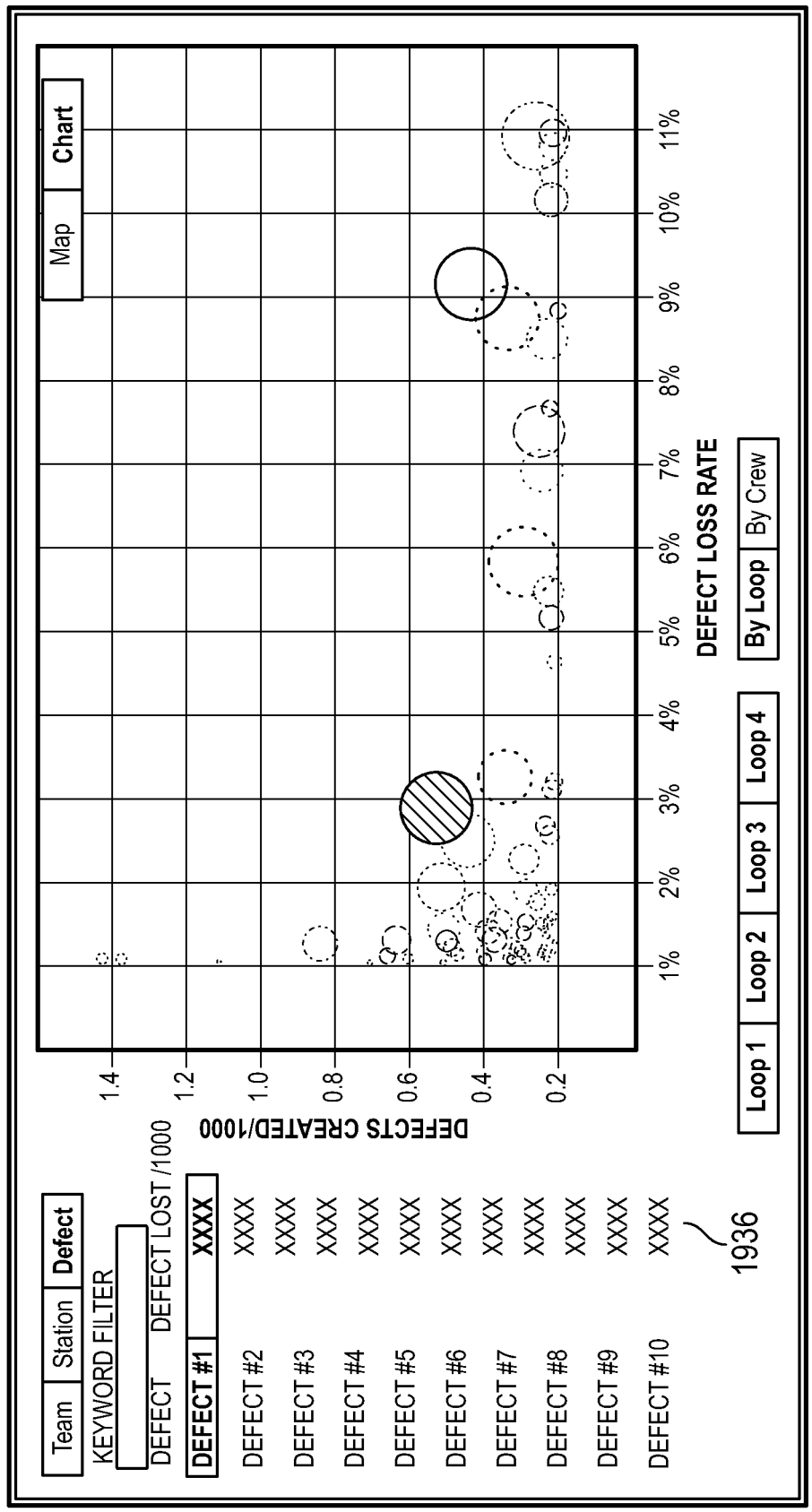
FIG. 19 illustrates an interactive aspect of an example heat map bubble chart.

A user can select a particular entry (e.g., Defect, Station, etc.) of interest in table 1936. An implementation can help the user identify the entry of interest on the bubble chart by highlighting the corresponding bubble, as illustrated in FIG. 19.

Figure 20:
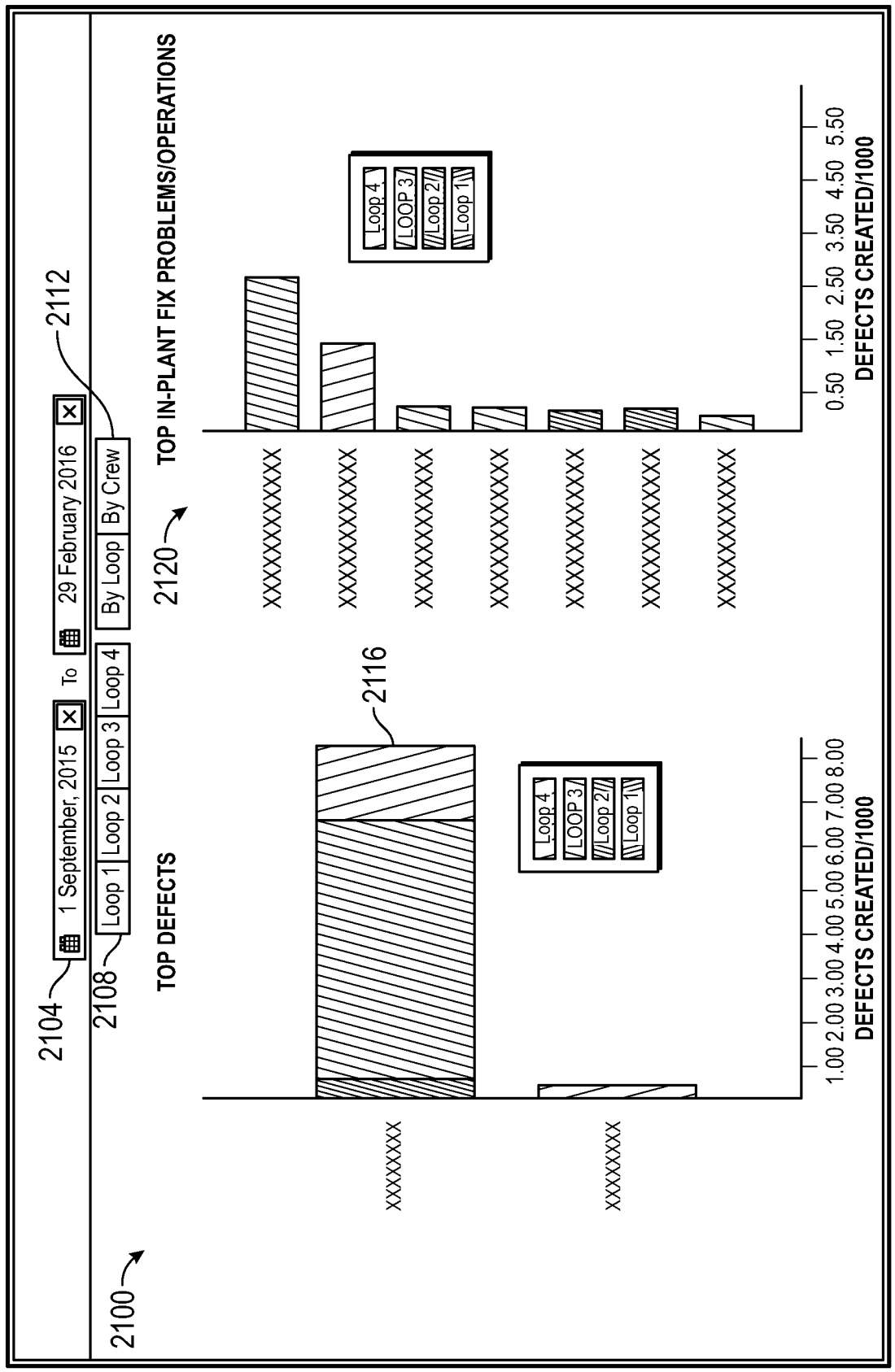
FIG. 20 illustrates an example heat map in bar charts associated with a manufacturing station.

An implementation can help a user investigate a particular quality control problem associated with a particular entry in table 1936. For example if the UI selector 1928 selects Station, and a particular station is selected in table 1936, an implementation can display GUI charts 2100 and 2120 associated with selected station, as shown in FIG. 20. Under this scenario, chart 2100 displays the most frequently occurring defects associated with the selected station. Each bar in the bar chart can be divided into sections based on the associated loop (or manufacturing crew, etc.), as selected by a UI selector 2112. Chart 2100 can help a user visualize the most frequent defect(s) associated with, e.g., a manufacturing station.

The relative sizes of different sections in a bar provide visual information to the effectiveness of quality control with respect to the particular defect. For example, bar 2116 has a small loop 2 section, a large loop 3 section, and a loop 4 section with a size between the sizes of the previous two sections. Using an example mapping of loop to manufacturing/warranty quality checkpoint described in connection with FIG. 14, this can indicate that the station of installation does not catch this defect (hence no loop 1 section), the subassembly quality checkpoint only detects a small number of such defects, the final manufacturing quality checkpoint detects a large number of such defects, and some such defects remain undetected or unsuccessfully repaired through the manufacturing cycle, leading to loop 4 warranty claims. Since a defect can be less costly to repair the earlier it is found, a manufacturer may have a quality control target which corresponds to a bar having larger sections of the earlier loops, e.g., an increasingly smaller section for each successive loop. Bar 2116, as illustrated, can help a user focus on loops 1 and 2 for quality control improvement directed at this defect, since these two loops appear to do a poor job in detecting this defect, as indicated by the bar.

Chart 2120 can display the most frequently occurring In-Plant Fix problems/repair locations associated with the selected station. Chart 2100 can help a user visualize the most frequent problems or repair locations associated with defect(s) at, e.g., a particular manufacturing station. Chart 2100 can help a user see descriptions in terms that can be close to a root cause of a defect, thereby enabling the user to take quality improvement actions effective in addressing the defect. Charts 2100 and 2120 can display data further filtered by, e.g., date range through UI 2104, loop number UI 2108, or other criteria. This can enable a user to focus on data of interest for the investigation.

Figure 21:
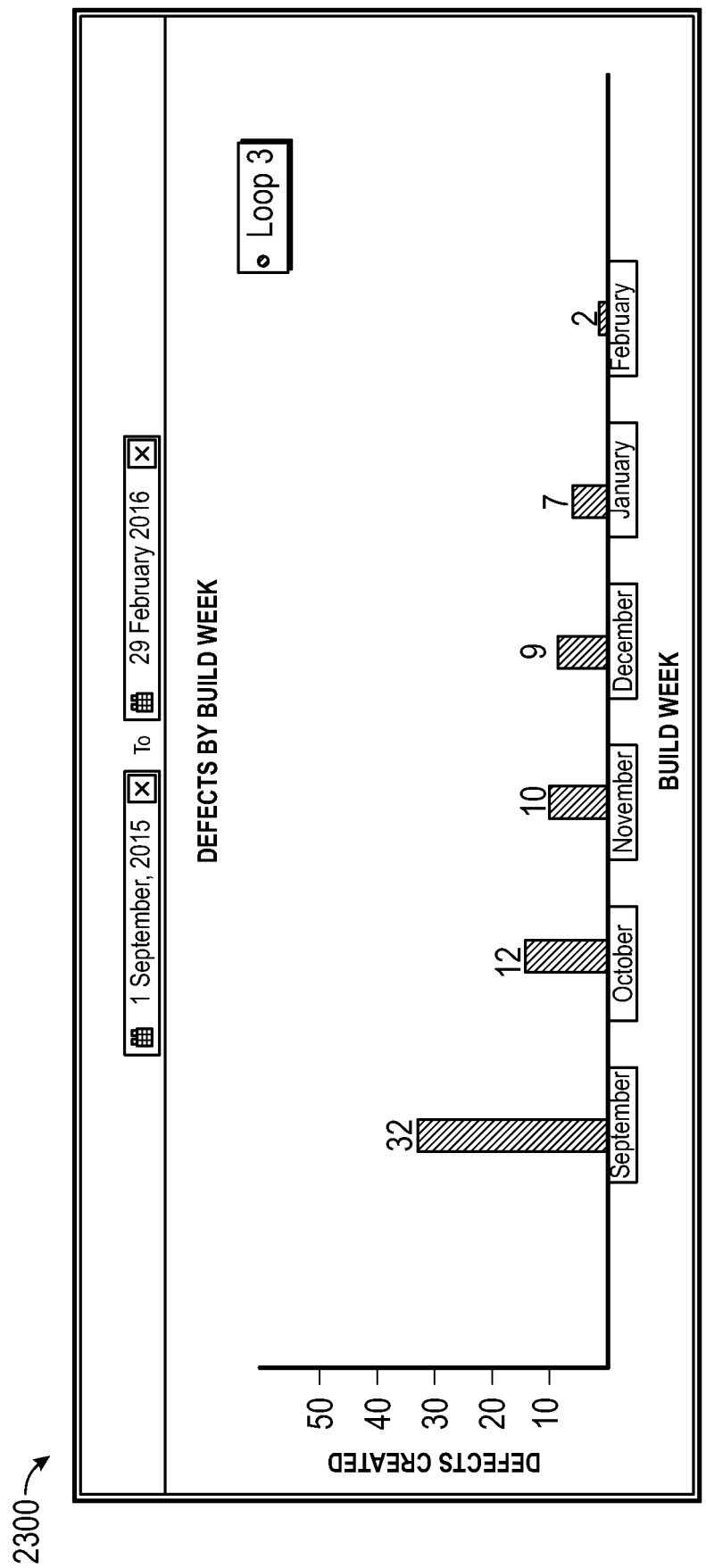
FIG. 21 illustrates an example heat map in a bar chart showing number of defects by build week.

An implementation can plot the selected defect data as a function of manufacturing time. For example, FIG. 21 shows a loop 3 defect data represented in bar 2116 with respect to Build Week (e.g., manufacturing work week). GUI chart 2300 illustrates that most of the problems occurred early in the displayed timeframe. This can suggest to a user that quality control of the defect has been properly addressed and no longer presents a problem. The user can choose to ignore this defect and focus his or her attention elsewhere.

An implementation can display the selected defect data on a product ID (e.g., UID) basis. For example, GUI table 2400 in FIG. 22 shows the selected loop 3 defect data by UID in column 2404. Defects are shown in column 2408. Defect #1 can be the defect represented by bar 2116. "Loop 1 Checks" column 2412 is empty, corresponding to a lack of a loop 1 section in bar 2116. The seven entries shown in table 2400 have entries in columns 2416, 2420, and 2024. This can indicate that the particular defect was detected and repaired on the corresponding UIDs in loops 2 and 3, but a warranty claim was still made about the defect. A user can conduct further investigation into the ineffectiveness of the in-plant repairs.

Figure 23:
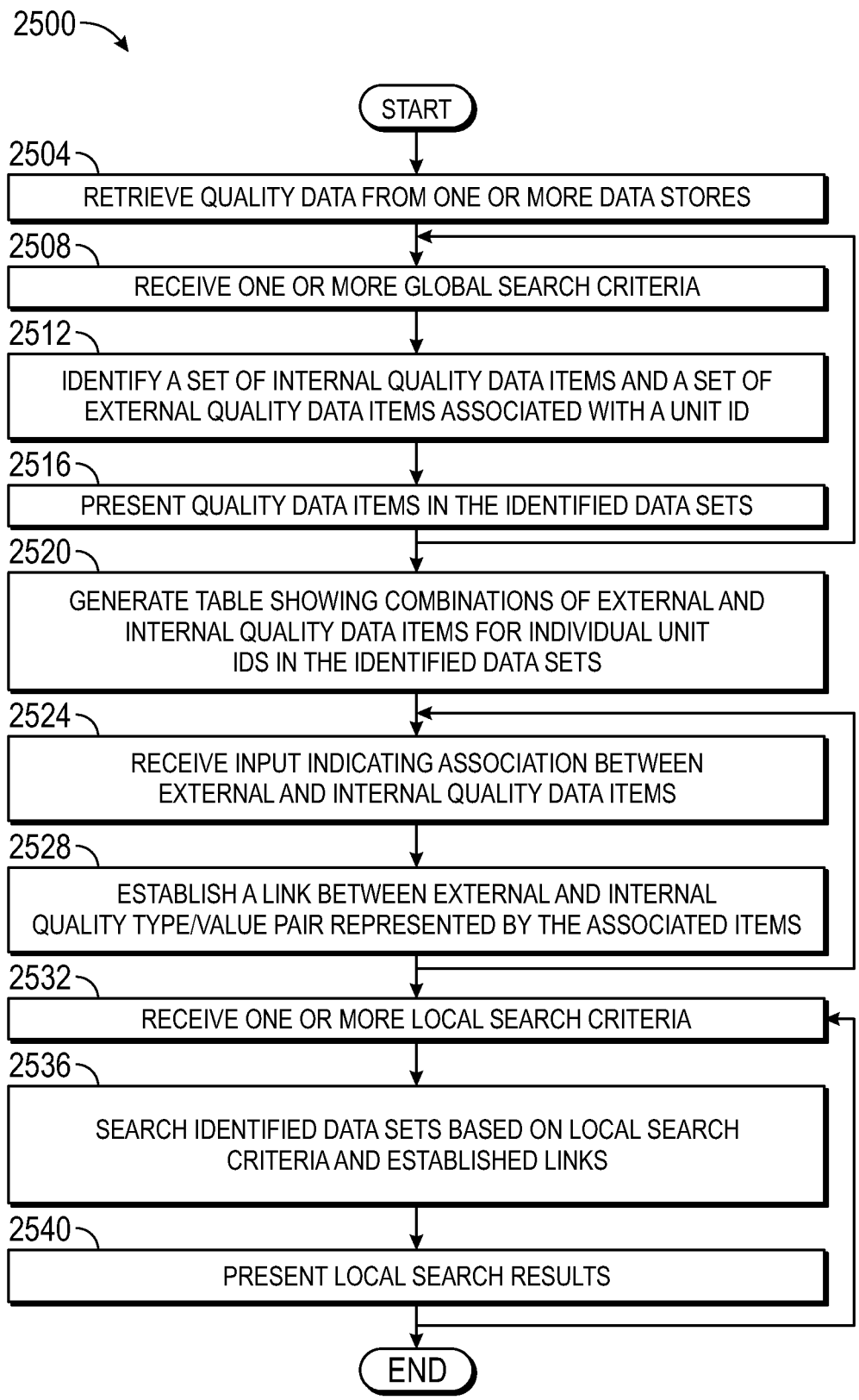
FIG. 23 illustrates a flowchart relating to an example quality control data association, analysis, and presentation process through linking internal quality type/value pairs and external quality type/value pairs through a global search.

FIG. 23 illustrates an example processing flow 2500 of a quality control database system according to the present disclosure. At block 2504, the example system can retrieve quality data from one or more data stores.

At block 2508, the system can receive one or more global search criteria. The search criteria can be input to the system through, for example, a quality investigation portal search screen 100 illustrated in FIG. 1. At block 2512, the system can identify a set of internal quality data items and the set of external quality data items associated with a unit ID based on the global search criteria. These data sets can be the results of the global search. These data sets can comprise unit IDs matching the global search criteria and internal and external quality data items associated with these unit IDs.

At block 2516, the system can present quality data items in the data sets. This presentation may be in one of a plurality of formats, for example, warranty claims by product manufacturing date (e.g., illustrated in FIG. 2), warranty claims by age of product or by product placement (e.g., illustrated in FIG. 3), warranty claim terms (e.g., illustrated and FIGS. 4 and 5), in-plant problem IDs, descriptions (e.g., illustrated in FIGS. 6 and 7), and so on. The system can support user interactivity through these presentations to update the global search criteria. The system can support adjustment to the global search criteria by iterating through a loop from block 2508 to block 2516.

At block 2520, the system can generate a table showing combinations of external quality data items and internal quality data items for individual unit IDs in the data sets. At block 2524, the system can receive an input indicating an association between an external quality data item and an internal quality data item. At block 2528, the system can establish and store a link between the external quality type/value pair and the internal quality type/value pair represented by the associated quality data items. Such a link associates external quality type/value pair data (e.g., Failure Type=Failure Type #1, etc.) and internal quality type/value pair (e.g., manufacturing date between Oct. 1, 2014 and Sep. 30, 2015 132, etc.). Such a link can help a user in investigating manufacturing problems associated with warranty claims. The system can iterate through a loop involving blocks 2524 and 2528, allowing a plurality of links to be established. This loop can be implemented through a table such as illustrated in FIGS. 8, 9 and 12.

At block 2532, the system can receive one or more local search criteria. At block 3536, the system can perform a local search within the data sets from the global search. The local search can be based on the local search criteria and the links established in block 2528. At block 2540, the system can present the local search results. Such presentation can be in the form of, for example, FIG. 10-11, 14-22.

Figure 24:
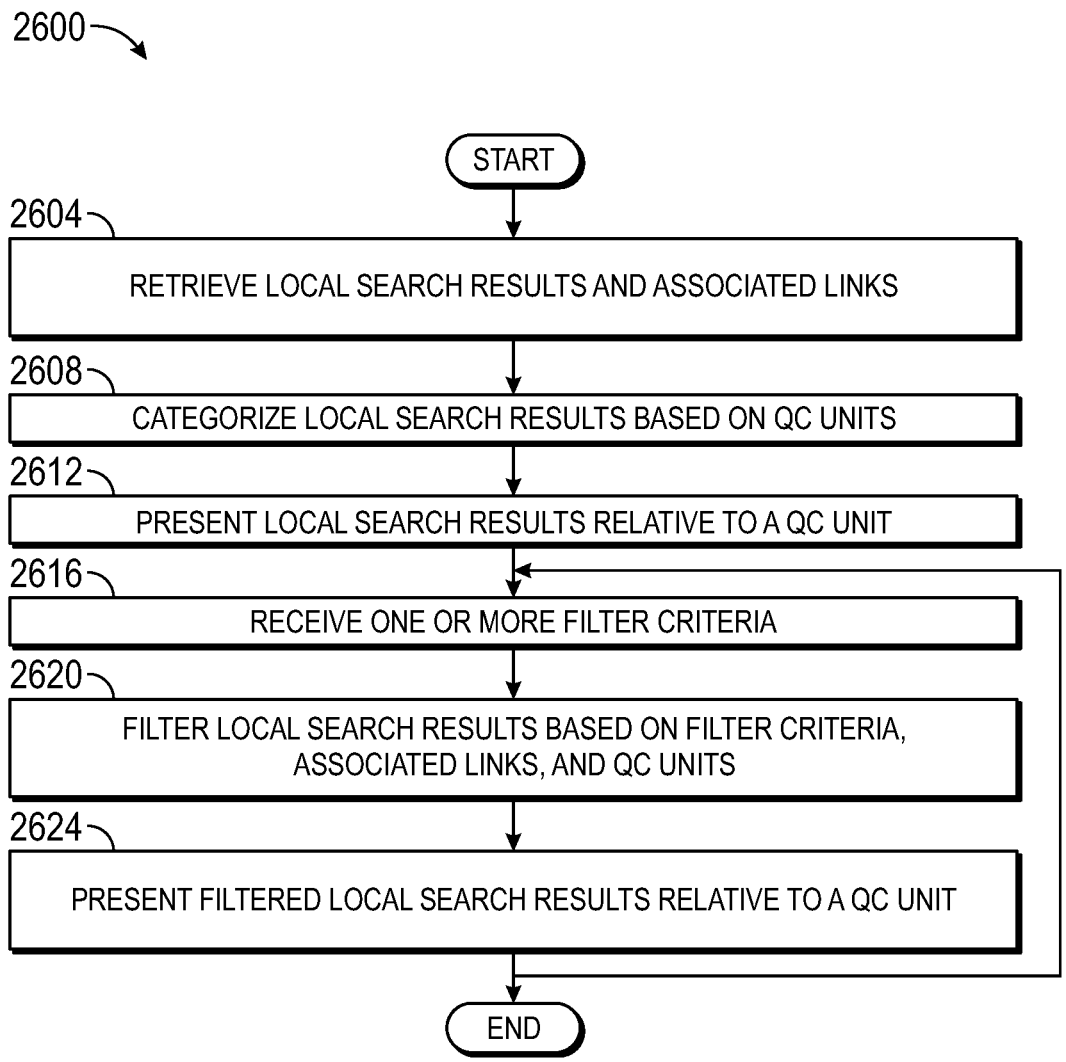
FIG. 24 illustrates a flowchart relating to an example quality control data analysis and presentation process through the use of links.

FIG. 24 illustrates an example processing flow 2600 of heat map generation. At block 2604, the system can retrieve local search results (e.g., from block 2536) and associated links. At block 2608, the system can categorize local search results based on quality control (QC) units (e.g., manufacturing stations, quality control checkpoints, defects, etc.). At block 2612, the system can present the categorized local search results relative to a quality control unit. This presentation can take the form of a heat map (e.g., maps 1440 and 1600), a heat map table (e.g., tables 1436, 2400), a heat map bar chart (e.g., charts 1800, 1820, 1840, 2100, 2120, 2200, 2220, 2300), a heat map bubble chart (e.g., chart 1900), etc.

At block 2616, the system can receive one or more filter criteria. The system can receive such criteria through UI associated with the presentation (e.g., that of block 2612). At block 2620, the system can filter the local search results based on the one or more filter criteria, associated links, and quality control units. At block 2624, the system can present the filtered search results relative to a QC unit. The QC unit in block 2624 may or may not be the same as the QC unit in block 2612. An implementation can be flexible and interactive to display a presentation in a form and with the content according to the user's input. The system can iterate through a loop from block 2616 to block 2624 to permit a user to see quality data in different forms and with different contents.

Figure 25:
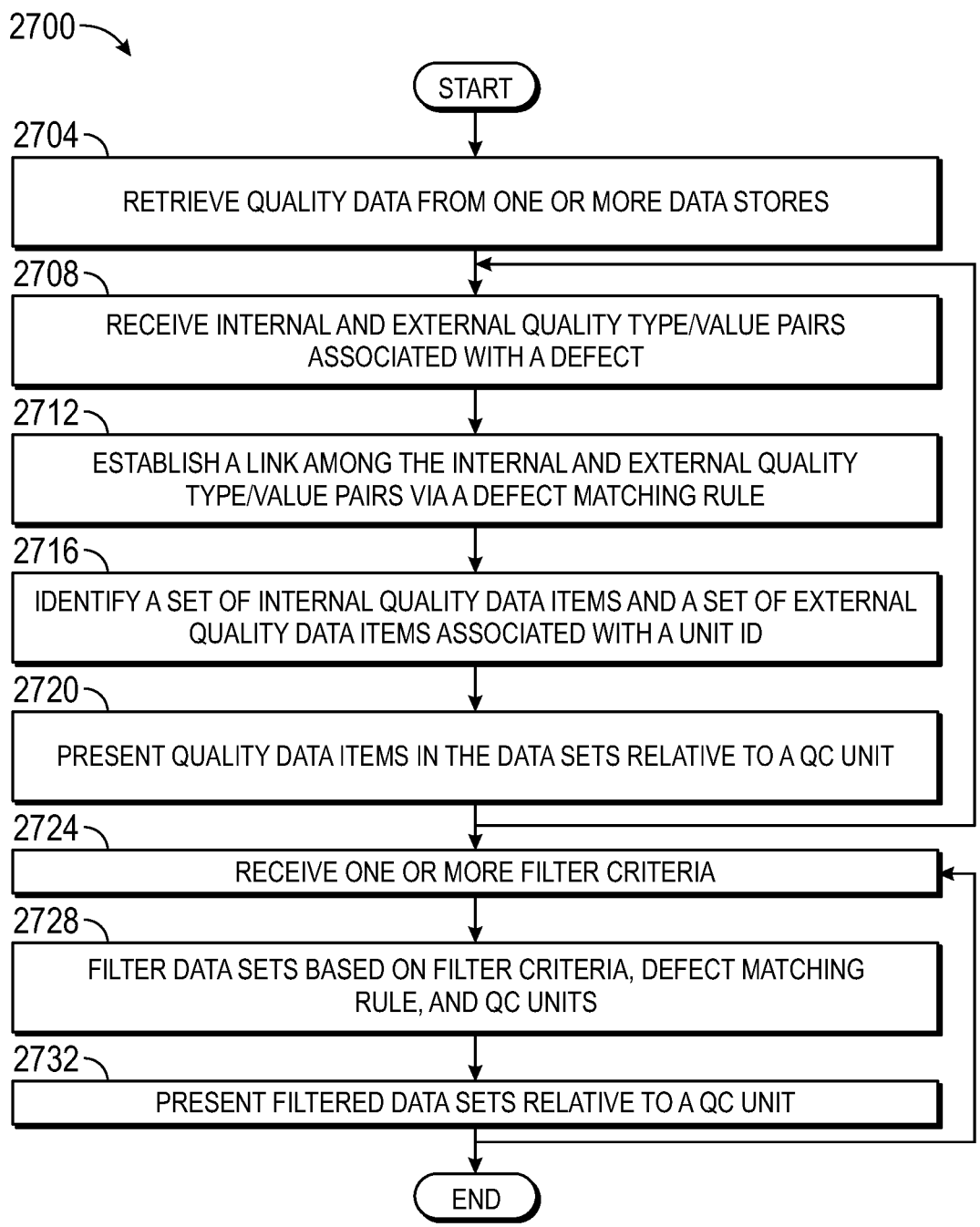
FIG. 25 illustrates a flowchart relating to an example quality control data association, analysis, and presentation process through linking internal quality type/value pairs and external quality type/value pairs with a defect matching rule.

FIG. 25 illustrates an example processing flow 2700 of heat map generation via defect matching rules. At block 2704, the example system can retrieve quality data from one or more data stores. The quality data comprises internal (e.g., in-plant) and external (e.g., in-field) quality data items. The one or more data stores can be operably connected to a processor of the system via a communication network or can be located locally to the processor.

At block 2708, the system can receive internal quality type/value pairs and external quality type/value pairs associated with a defect. At block 2712, the system can establish a link among the internal quality type/value pairs, external quality type/value pairs, and the defect via a defect matching rule. These steps can be done through a UI such as the one illustrated in FIG. 12. At block 2716, the system can form a data set of quality data items associated with a unit ID based on the defect matching rule. At block 2720, the system can present quality data items in the data set relative to a quality control unit. The system can iterate through a loop from block 2708 to block 2720 to permit a user to adjust type/value pairs linked with a defect, or to define new defect matching rules. The presentation in block 2720 can be in one of many forms, e.g., those described in connection with block 2612.

At block 2724, the system can receive one or more filter criteria. The system can receive such criteria through UI associated with the presentation (e.g., that of block 2720). At block 2728, the system can filter the data set based on the one or more filter criteria, associated defect matching rules, and quality control units. At block 2732, the system can present the filtered data subset relative to a QC unit. The QC unit in block 2732 may or may not be the same as the QC unit in block 2720. An implementation can be flexible and interactive to display presentations in a form and with the content according to the user's input. The system can iterate through a loop from block 2724 to block 2732 to permit a user to see quality data in different forms and with different contents.

Figure 26:
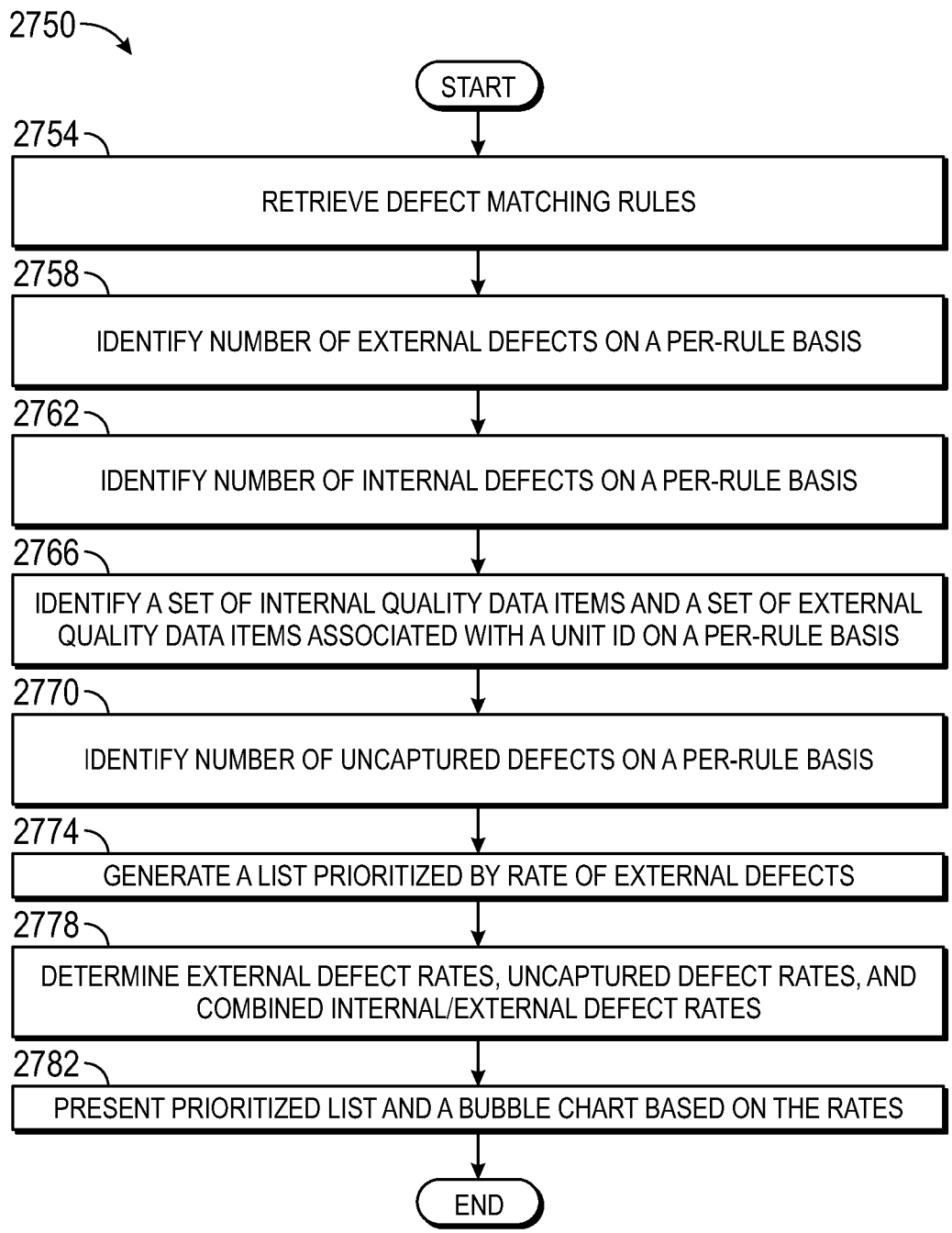
FIG. 26 illustrates a flowchart relating to constructing a bubble chart through the use of defect matching rules.

FIG. 26 illustrates an example processing flow 2700 of bubble chart generation via defect matching rules. At block 2754, the example system can retrieve defect matching rules from one or more data stores or from one or more memories associated with a processor. At block 2758, the system can identify the number of external defects on a per-rule basis. At block 2762, the system can identify the number of internal defects on a per-rule basis. At block 2766, the system can identify a set of internal quality data items and a set of external quality data items associated with a unit ID on a per-rule basis, thereby identifying uncaptured defects on a per-rule basis. At block 2670, the system can identify number of uncaptured defects on a per-rule basis.

Continuing on to block 2674, the system can generate a list prioritized or ordered by rate of external defects. This rate of external defects can be, e.g., Defect Loss/1000 as shown in FIG. 19. At block 2678, the system can determine external defect rates (which can be the same as rates determined in block 2674), uncaptured defect rates, and combined internal and external defect rates.

At block 2682, the system can draw a bubble chart, e.g., similar to those illustrated in FIGS. 19 and 20. As explained above in connection with these figures, the horizontal axis value of a defect bubble can be based on uncaptured or undetected defect rates; the vertical axis value can be based on combined internal and external defect rates; the bubble size can be based on external defect rates. All these rates are determined earlier in the flow chart 2750.

V. Example Computer System

Figure 27:
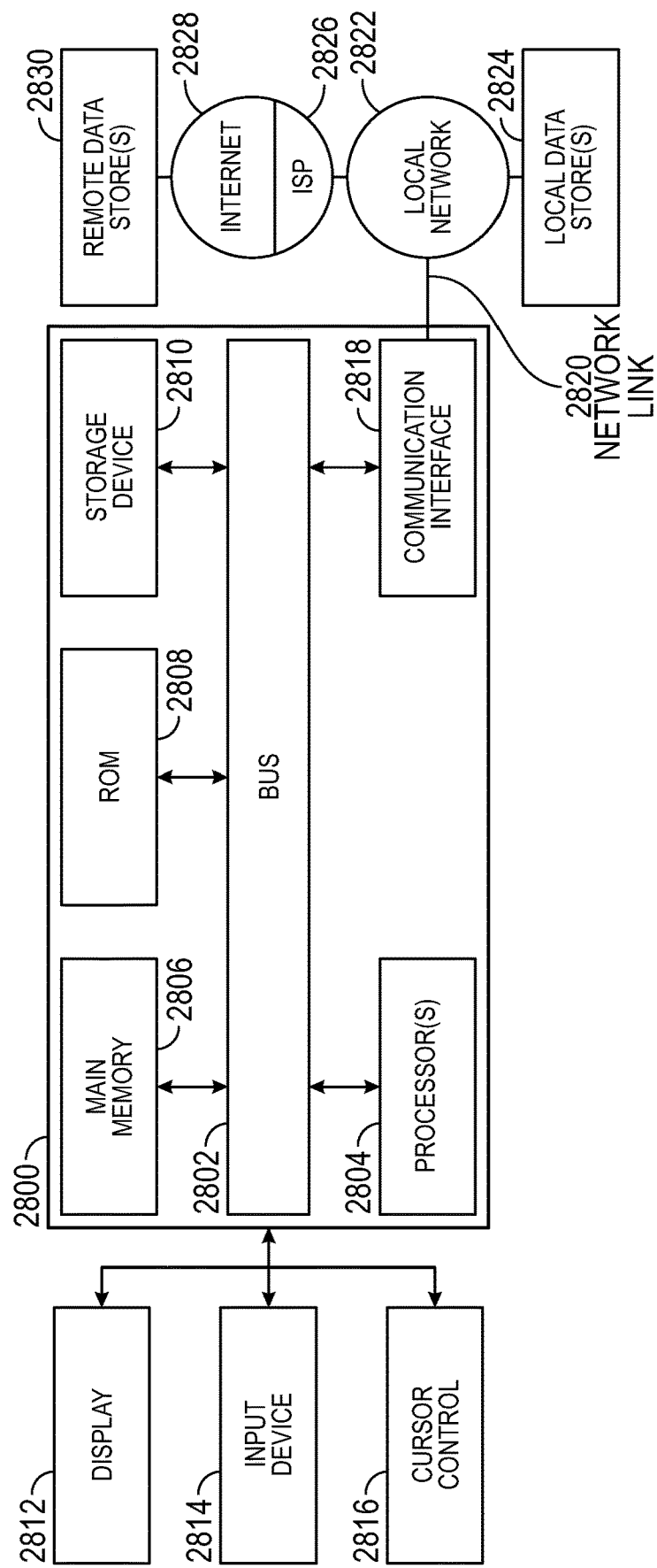
FIG. 27 illustrates a computer system with which certain methods discussed herein may be implemented.

FIG. 27 is a block diagram that illustrates a computer system 2800 upon which an embodiment may be implemented. Computer system 2800 includes a bus 2802 or other communication mechanism for communicating information, and a hardware processor, or multiple processors, 2804 coupled with bus 2802 for processing information. Hardware processor(s) 2804 may be, for example, one or more general purpose microprocessors.

Computer system 2800 also includes a main memory 2806, such as a random access memory (RAM), cache and/or other dynamic storage devices (or other computer readable storage medium), coupled to bus 2802 for storing information and instructions to be executed by processor 2804. Main memory 2806 also may be used for storing temporary variables or other intermediate information during execution of instructions to be executed by processor 2804. Such instructions, when stored in storage media accessible to processor 2804, render computer system 2800 into a special-purpose machine that is customized to perform the operations specified in the instructions.

Computer system 2800 further includes a read only memory (ROM) 282808 or other static storage device (or other computer readable storage medium) coupled to bus 2802 for storing static information and instructions for processor 2804. A storage device 2810, such as a magnetic disk, optical disk, or USB thumb drive (Flash drive), or other computer readable storage medium, is provided and coupled to bus 2802 for storing information and instructions.

Computer system 2800 may be coupled via bus 2802 to a display 2812, such as a cathode ray tube (CRT) or LCD display (or touch screen), for displaying information to a computer user. An input device 2814, including alphanumeric and other keys, is coupled to bus 2802 for communicating information and command selections to processor 2804. Another type of user input device is cursor control 2816, such as a mouse, a trackball, or cursor direction keys for communicating direction information and command selections to processor 2804 and for controlling cursor movement on display 2812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computer system 2800 may include a user interface module to implement a GUI that may be stored in a mass storage device as executable software codes that are executed by the computing device(s). The computer system 2800 may further include additional modules or other computer readable program instructions for carrying out other operations and functionality of the system as described herein. Computer system 2800 may implement the techniques described herein using software, hardware, or a combination of the two, as described further below.

Various forms of media may be involved in carrying one or more sequences of one or more instructions to processor 2804 for execution. For example, the instructions may initially be carried on a magnetic disk or solid state drive of a remote computer. The remote computer can load the instructions into its dynamic memory and send the instructions over a telephone line using a modem. A modem local to computer system 2800 can receive the data on the telephone line and use an infra-red transmitter to convert the data to an infra-red signal. An infra-red detector can receive the data carried in the infra-red signal and appropriate circuitry can place the data on bus 2802. Bus 2802 carries the data to main memory 2806, from which processor 2804 retrieves and executes the instructions. The instructions received by main memory 2806 may optionally be stored on storage device 2810 either before or after execution by processor 2804.

Computer system 2800 also includes a communication interface 282818 coupled to bus 2802. Communication interface 282818 provides a two-way data communication coupling to a network link 2820 that is connected to a local network 2822. For example, communication interface 282818 may be an integrated services digital network (ISDN) card, cable modem, satellite modem, or a modem to provide a data communication connection to a corresponding type of telephone line. As another example, communication interface 282818 may be a local area network (LAN) card to provide a data communication connection to a compatible LAN (or WAN component to communicated with a WAN). Wireless links may also be implemented. In any such implementation, communication interface 282818 sends and receives electrical, electromagnetic or optical signals that carry digital data streams representing various types of information.

Network link 2820 typically provides data communication through one or more networks to other data devices. For example, network link 2820 may provide a connection through local network 2822 to a host computer and one or more local data stores 2824, or to data equipment operated by an Internet Service Provider (ISP) 2826. ISP 2826 in turn provides data communication services through the world wide packet data communication network now commonly referred to as the "Internet" 2828. Local network 2822 and Internet 2828 both use electrical, electromagnetic or optical signals that carry digital data streams. The signals through the various networks and the signals on network link 2820 and through communication interface 282818, which carry the digital data to and from computer system 2800, are example forms of transmission media.

Computer system 2800 can send messages and receive data, including program code, through the network(s), network link 2820 and communication interface 282818. In the Internet example, a server or remote data stores 2830, via that Internet 2828, might transmit a requested code for an application program through Internet 2828, ISP 2826, local network 2822 and communication interface 282818.

The received code may be executed by processor 2804 as it is received, and/or stored in storage device 2810, or other non-volatile storage for later execution.

Remote data stores 2830 and local data stores 2824 may include any number of data stores accessible by the computer system 2800, and may in various implementations be directly accessible or indirectly (e.g., via a network or the Internet) by the computer system 2800. The data stores may include one or more databases, as described above, which may store data items in any suitable format for accessing and processing by the computer system 2800.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   one or more data stores configured to store:
   computer readable program instructions, and
   a set of quality data including internal quality data items and external quality data items, wherein:
      the quality data items are indicative of defects of manufactured items,
      the internal quality data items are associated with defects found during manufacture or quality control of the item, and
      the external quality data items are associated with defects found after manufacture or quality control of the manufactured items, or as part of a warranty process related to the manufactured items; and
   a plurality of defect matching rules each rule indicative of one of a plurality of species of defects associated with:
      internal quality data items indicative of internal defects; or
      external quality data items indicative of external defects; and
   one or more processors configured to execute the computer readable program instructions in order to:
      apply the plurality of defect matching rules to the quality data items to identify the internal defects and external defects of various species;
      receive one or more search criteria;
      based on the one or more search criteria, identify a set of internal quality data items and a set of external quality data items, wherein each of the internal and external quality data items in the respective sets are associated with a unit identifier of the item;
      in response to the identifying of the set of internal quality data items and the set of external quality data items, determine combinations of the internal defects of the various species and the external defects of the various species, wherein each combination includes at least an internal quality data item of the set of internal quality data items and an external quality data item of the set of external quality data items associated with a respective same unit identifier;
      generate user interface data configured for rendering a first user interface, the first user interface including a listing of each of the determined combinations;
      receive a user input indicating an association between a first internal quality data item and a first external quality data item of one of the determined combinations;
      in response to the receiving of the user input, establish a link between the first internal quality data item and the first external quality data item, wherein the link is indicative of an uncaptured defect of a first manufactured item, and wherein the first internal quality data item and first external quality data item are associated with the same unit identifier that is associated with the first manufactured item; and
      generate user interface data configured for rendering a second user interface, the second user interface including a table showing a plurality of columns indicating at least the association between the first internal quality data item and the first external quality data item, and the link between the first internal quality data item and the first external quality data item.

2. The system of claim 1, wherein the table in the second user interface further includes:
   in a first column, first indications of one or more internal quality data items of the set of internal quality data items, or first indications of one or more the external quality data items of the set of external quality data items;

in a second column, second indications of numbers of combinations of the one or more internal quality data items and the one or more external quality data items that are linked; and in a third column, third indications of numbers of combinations of the one or more internal quality data items and the one or more external quality data items that are not linked, thereby indicating numbers of captured defects or undetected defects.

3. The system of claim 2, wherein the second and third indications of numbers represent numbers of units.

4. The system of claim 2, wherein the second and third indications of numbers are percentage numbers.

5. The system of claim 1, wherein a search criterion of the one or more search criteria is received via a user interface presenting internal quality data items in the identified set or external quality data items in the identified set.

6. The system of claim 1, wherein the one or more processors is further configured to store the established link in a data store.

7. The system of claim 1, wherein the computer readable program instructions, when executed by the one or more processors, further configure the one or more processors to:
 receive an indication of a disassociation of a second external quality data item and a second internal quality data item linked with the second external quality data item; and
 de-establish the link between a value of the second external quality data item and a value of the second internal quality data item in response to the indication.

8. The system of claim 1, wherein the computer readable program instructions, when executed by the one or more processors, further configure the one or more processors to:
 classify the uncaptured defect based on a last quality checkpoint in the set of external quality data items and the set of internal quality data items associated with the unit identifier; and
 generate a visual presentation based, at least in part, on the classification of the defect.

9. A method comprising:
 applying a plurality of defect matching rules to quality data items to identify internal defects and external defects of various species, wherein the quality data items are indicative of defects of manufactured items, and wherein the plurality of defect matching rules comprises rules that are each indicative of one of a plurality of species of defects associated with:
  internal quality data items indicative of internal defects found during manufacture or quality control of the item; or
  external quality data items indicative of external defects found after manufacture or quality control of the manufactured items, or as part of a warranty process related to the manufactured items;
 receiving one or more search criteria;
 based on the one or more search criteria, identifying a set of internal quality data items and a set of external quality data items, wherein each of the internal and external quality data items in the respective sets are associated with a unit identifier of the item;
 in response to the identifying of the set of internal quality data items and the set of external quality data items, determining combinations of the internal defects of the various species and the external defects of the various species, wherein each combination includes at least an internal quality data item of the set of internal quality data items and an external quality data item of the set of external quality data items associated with a respective same unit identifier;
 generating user interface data configured for rendering a first user interface, the first user interface including a listing of each of the determined combinations;
 receiving a user input indicating an association between a first internal quality data item and a first external quality data item of one of the determined combinations;
 in response to the receiving of the user input, establishing a link between the first internal quality data item and the first external quality data item, wherein the link is indicative of an uncaptured defect of a first manufactured item, and wherein the first internal quality data item and first external quality data item are associated with the same unit identifier that is associated with the first manufactured item; and
 generating user interface data configured for rendering a second user interface, the second user interface including a table showing a plurality of columns indicating at least the association between the first internal quality data item and the first external quality data item, and the link between the first internal quality data item and the first external quality data item.

10. The method of claim 9, wherein the table in the second user interface further includes:
 in a first column, first indications of one or more internal quality data items of the set of internal quality data items, or first indications of one or more the external quality data items of the set of external quality data items;
 in a second column, second indications of numbers of combinations of the one or more internal quality data items and the one or more external quality data items that are linked; and
 in a third column, third indications of numbers of combinations of the one or more internal quality data items and the one or more external quality data items that are not linked, thereby indicating numbers of captured defects or undetected defects.

11. The method of claim 9, wherein a search criterion of the one or more search criteria is received via a user interface presenting internal quality data items in the identified set or external quality data items in the identified set.

12. The method of claim 9, further comprising:
 storing the established link in a data store.

13. The method of claim 9, further comprising:
 receiving an indication of a disassociation of a second external quality data item and a second internal quality data item linked with the second external quality data item; and
 de-establishing the link between a value of the second external quality data item and a value of the second internal quality data item in response to the indication.

14. The method of claim 9, further comprising:
 classifying the uncaptured defect based on a last quality checkpoint in the set of external quality data items and the set of internal quality data items associated with the unit identifier; and
 generating a visual presentation based, at least in part, on the classification of the defect.

15. A non-transitory computer-readable medium storing a set of instructions that are executable by one or more processors to cause the one or more processors to:

apply a plurality of defect matching rules to quality data items to identify internal defects and external defects of various species, wherein the quality data items are indicative of defects of manufactured items, and wherein the plurality of defect matching rules comprises rules that are each indicative of one of a plurality of species of defects associated with:
   internal quality data items indicative of internal defects found during manufacture or quality control of the item; or
   external quality data items indicative of external defects found after manufacture or quality control of the manufactured items, or as part of a warranty process related to the manufactured items;
receive one or more search criteria;
based on the one or more search criteria, identify a set of internal quality data items and a set of external quality data items, wherein each of the internal and external quality data items in the respective sets are associated with a unit identifier of the item;
in response to the identifying of the set of internal quality data items and the set of external quality data items, determine combinations of the internal defects of the various species and the external defects of the various species, wherein each combination includes at least an internal quality data item of the set of internal quality data items and an external quality data item of the set of external quality data items associated with a respective same unit identifier;
generate user interface data configured for rendering a first user interface, the first user interface including a listing of each of the determined combinations;
receive a user input indicating an association between a first internal quality data item and a first external quality data item of one of the determined combinations;
in response to receiving the user input, establish a link between the first internal quality data item and the first external quality data item, wherein the link is indicative of an uncaptured defect of a first manufactured item, and wherein the first internal quality data item and first external quality data item are associated with the same unit identifier that is associated with the first manufactured item; and
generate user interface data configured for rendering a second user interface, the second user interface including a table showing a plurality of columns indicating at least the association between the first internal quality data item and the first external quality data item, and the link between the first internal quality data item and the first external quality data item.

16. The non-transitory computer-readable medium of claim 15, wherein the table in the second user interface further includes:
   in a first column, first indications of one or more internal quality data items of the set of internal quality data items, or first indications of one or more the external quality data items of the set of external quality data items;
   in a second column, second indications of numbers of combinations of the one or more internal quality data items and the one or more external quality data items that are linked; and
   in a third column, third indications of numbers of combinations of the one or more internal quality data items and the one or more external quality data items that are not linked, thereby indicating numbers of captured defects or undetected defects.

17. The non-transitory computer-readable medium of claim 15, wherein a search criterion of the one or more search criteria is received via a user interface presenting internal quality data items in the identified set or external quality data items in the identified set.

18. The non-transitory computer-readable medium of claim 15, wherein the one or more processors is further configured to store the established link in a data store.

19. The non-transitory computer-readable medium of claim 15, wherein the one or more processors are further configured to:
   receive an indication of a disassociation of a second external quality data item and a second internal quality data item linked with the second external quality data item; and
   de-establish the link between a value of the second external quality data item and a value of the second internal quality data item in response to the indication.

20. The non-transitory computer-readable medium of claim 15, wherein the one or more processors are further configured to:
   classify the uncaptured defect based on a last quality checkpoint in the set of external quality data items and the set of internal quality data items associated with the unit identifier; and
   generate a visual presentation based, at least in part, on the classification of the defect.

* * * * *